(12) United States Patent
Jeong et al.

(10) Patent No.: US 10,699,674 B2
(45) Date of Patent: Jun. 30, 2020

(54) IMAGE PROCESSING APPARATUS, IMAGE PROCESSING METHOD AND MULTI-SCREEN DISPLAY

(71) Applicant: SAMSUNG ELECTRONICS CO., LTD., Suwon-si (KR)

(72) Inventors: Young Hoon Jeong, Suwon-si (KR); Jae Moon Lim, Suwon-si (KR); Joseph Kim, Suwon-si (KR); Chun Zhao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/235,775

(22) Filed: Dec. 28, 2018

(65) Prior Publication Data

US 2019/0206364 A1 Jul. 4, 2019

(30) Foreign Application Priority Data

Dec. 28, 2017 (KR) .................. 10-2017-0182018

(51) Int. Cl.
| | | |
|---|---|---|
| *G09G 5/10* | (2006.01) | |
| *G06T 5/00* | (2006.01) | |
| *G06F 3/14* | (2006.01) | |
| *G09G 3/32* | (2016.01) | |
| *G09G 3/20* | (2006.01) | |
| *G09G 3/3208* | (2016.01) | |

(52) U.S. Cl.
CPC .............. *G09G 5/10* (2013.01); *G06F 3/1446* (2013.01); *G06T 5/009* (2013.01); *G09G 3/2096* (2013.01); *G09G 3/3208* (2013.01); *G09G 3/32* (2013.01); *G09G 2300/026* (2013.01); *G09G 2320/0242* (2013.01); *G09G 2320/0271* (2013.01); *G09G 2320/066* (2013.01); *G09G 2320/0626* (2013.01); *G09G 2330/021* (2013.01); *G09G 2360/16* (2013.01)

(58) Field of Classification Search
None
See application file for complete search history.

(56) References Cited

U.S. PATENT DOCUMENTS

| | | | |
|---|---|---|---|
| 9,445,484 | B2 | 9/2016 | Yoneoka et al. |
| 10,186,232 | B2 * | 1/2019 | Huang ............... G09G 3/2003 |
| 2008/0218468 | A1 | 9/2008 | Kim et al. |

(Continued)

FOREIGN PATENT DOCUMENTS

| | | |
|---|---|---|
| KR | 10-2005-0059599 A | 6/2005 |
| WO | 2018/030146 A1 | 2/2018 |

OTHER PUBLICATIONS

Chen, Xiang, Yiran Chen, and Chun Jason Xue. "DaTuM: Dynamic tone mapping technique for OLED display power saving based on video classification." 2015 52nd ACM/EDAC/IEEE Design Automation Conference (DAC). IEEE, 2015. (Year: 2015).*

(Continued)

*Primary Examiner* — Nurun N Flora
(74) *Attorney, Agent, or Firm* — Sughrue Mion, PLLC

(57) ABSTRACT

An image processing apparatus for minimizing a collective amount of power consumed by a plurality of display apparatuses of a multi-screen system to display an image of the multi-screen system, and for optimizing hue and luminance of the image of the multi-screen system.

20 Claims, 14 Drawing Sheets

(56) References Cited

U.S. PATENT DOCUMENTS

| | | | |
|---|---|---|---|
| 2010/0053222 A1* | 3/2010 | Kerofsky | G09G 3/3406 |
| | | | 345/690 |
| 2010/0225673 A1* | 9/2010 | Miller | G09G 3/2003 |
| | | | 345/690 |
| 2011/0298843 A1* | 12/2011 | Hajjar | G09G 5/10 |
| | | | 345/690 |
| 2016/0203771 A1 | 7/2016 | Kwon et al. | |
| 2017/0256039 A1 | 9/2017 | Hsu et al. | |
| 2018/0068637 A1* | 3/2018 | Ninan | G09G 3/3426 |

OTHER PUBLICATIONS

International Search Report (PCT/ISA/210) & Written Opinion (PCT/ISA/237) dated Apr. 19, 2019 issued by the International Searching Authority in International Application No. PCT/KR2018/016594.
Communication dated Feb. 14, 2019 issued by the European Patent Office in European counterpart Application No. 18248083.0.
Tomokazu Shiga et al., "Power Reduction of OLED Displays by Tone Mapping Based on Helmholtz-Kohlrausch Effect", IEICE Transactions on Electronics, vol. E100-C, No. 11, Tokyo, JP, XP055664555, Nov. 11, 2017, pp. 1026-1030.
Communication dated Feb. 17, 2020, issued by the European Patent Office in counterpart European Application No. 18 248 083.0.

* cited by examiner

IMAGE PROCESSING APPARATUS, IMAGE PROCESSING METHOD AND MULTI-SCREEN DISPLAY

CROSS-REFERENCE TO RELATED APPLICATION

This application is based on and claims priority under 35 U.S.C. § 119 to Korean Patent Application No. 10-2017-0182018, filed on Dec. 28, 2017, in the Korean Intellectual Property Office, the disclosure of which is incorporated by reference herein in its entirety.

BACKGROUND

1. Field

The disclosure relates to an image processing apparatus, an image processing method, and a multi-screen display, and more particularly, to an image processing apparatus, an image processing method, and a multi-screen display capable of transmitting image data to a plurality of display apparatuses.

2. Description of the Related Art

In general, a display apparatus is an apparatus for visually displaying image information to a user. The display apparatus is widely used in various fields, both residential and commercial.

For example, examples of display apparatuses include a monitor connected to a personal computer (PC), a server computer, or the like, a portable computer, a navigation terminal, a television, an Internet Protocol Television (IPTV), a portable terminal (for example, a smart phone, a tablet PC, Personal Digital Assistant (PDA), or a cellular phone), and any other kinds of various of displays used to reproduce images of advertisements or movies in industrial fields, and related audio/video systems.

A display apparatus may display images using various kinds of display panels. For example, the display panels may include a Light Emitting Diode (LED) panel, an Organic Light Emitting Diode (OLED) panel, a Liquid Crystal Display (LCD) panel, etc.

There is a multi-screen apparatus for implementing a large screen, in which a plurality of display apparatuses are connected to each other to output an image. For example, products, such as Large Format Display (LFD) and LED Signage, are widely installed in stores, auditoriums, conference rooms, offices, public places, etc.

Multi-screen apparatuses include various non-emissive and emissive panels in order to form a large screen of hundreds of inches or more, and are configured in various sizes and shapes. Multi-screen apparatuses may be used for various purposes, such as products advertisement, information sharing, stage performance/games, entertainment, etc.

Recently, multi-screen apparatuses are installed indoors, as well as outdoors. However, the multi-screen apparatuses consume a large amount of power due to the large quantity of displays. Further, as the amount of light output from the plurality of displays increases, a user's eyes may be dazzled.

SUMMARY

Therefore, it is an aspect of the disclosure to provide an image processing apparatus, an image processing method, and a multi-screen display for transmitting image data to a plurality of display apparatuses that can display an image together as one body.

It is another aspect of the disclosure to provide an image processing apparatus, an image processing method, and a multi-screen display for reducing power consumption of a multi-screen apparatus.

It is still another aspect of the disclosure to provide an image processing apparatus, an image processing method, and a multi-screen display for improving a contrast ratio of a multi-screen apparatus.

Additional aspects of the disclosure will be set forth in part in the description which follows and, in part, will be obvious from the description, or may be learned by practice of the disclosure.

In accordance with an aspect of the disclosure, there is provided an image processing apparatus including: a communicator configured to communicate with a plurality of display apparatuses that collectively display an image of a multi-screen system; and a controller configured to process image data to be displayed as the image of the multi-screen system on the plurality of display apparatuses, wherein the controller is configured process the image data by: applying a tone mapping curve that is generated based on a maximum of amount of power, among amounts of power respectively consumed by the plurality of display apparatuses to display respective portions of the image of the multi-screen system thereon, compensating for hue of the image data, and increasing maximum luminance of the image data, and control the communicator to transmit processed image data to the plurality of display apparatuses to display the image of the multi-screen system.

The controller may generate a tone mapping curve such that a total of the amounts of the power consumed by the plurality of display apparatuses to display the image of the multi-screen system is minimized.

The controller may generate a tone mapping curve such that a sum of the total of the amounts of the power consumed by the plurality of display apparatuses to display the image of the multi-screen system and the maximum amount of power consumed is minimized.

The controller may generate a tone mapping curve such that a sum of the total of the amounts of the power consumed by the plurality of display apparatuses, to which a first weight is applied, and the maximum amount power, to which a second weight different from the first weight is applied, becomes a minimum value, the first weight and the second weight are determined based on at least one of saturation and luminance of the image data.

The controller may generate a tone mapping curve is generated such that a sum of a quantified similarity between the tone mapping curve and an identity curve, a quantified similarity between the tone mapping curve and a contrast ratio enhancing curve, a total of the amounts of the power consumed by the plurality of display apparatuses, and the amounts of the power consumed by the plurality of display apparatuses is minimized.

The controller may compensate for hue of the image data by increasing saturation of the image data.

The controller may increase maximum luminance of the image data based on the maximum amount of power.

The controller may determine a current gain of driving current of the plurality of display apparatuses based on the maximum amount of power.

In accordance with another aspect of the disclosure, there is provided an image processing method for processing image data to be displayed by a plurality of display apparatuses that collectively display an image of a multi-screen system, including: generating a tone mapping curve based on a maximum of amount of power, among amounts of power respectively consumed by the plurality of display apparatuses to display respective portions of the image of the multi-screen system thereon; applying the tone mapping curve to the image data; compensating for hue of the image data; increasing maximum luminance of the image data; and transmitting processed image data to the plurality of display apparatuses to display the image of the multi-screen system.

The generating of the tone mapping curve may include generating a tone mapping curve such that a sum of the total of the amounts of the power consumed by display apparatuses to display the image of the multi-screen system and the maximum amount of power is minimized.

The generating of the tone mapping curve may include generating of the tone mapping curve comprises generating a tone mapping curve such that a sum of the total of the amounts of the power consumed by display apparatuses, to which a first weight is applied, and the maximum amount of power, to which a second weight different from the first weight is applied, is minimized, and the first weight and the second weight may be determined based on at least one of saturation and luminance of the image data.

The generating of the tone mapping curve may include generating a tone mapping curve such that a sum of a quantified similarity between the tone mapping curve and an identity curve, a quantified similarity between the tone mapping curve and a contrast ratio enhancing curve, a total of the amounts of the power consumed by the plurality of display apparatuses, and the amounts of the power consumed by the plurality of display apparatuses is minimized.

The compensating for the hue of the image data may include increasing saturation of the image data.

The compensating for the hue of the image data may include: increasing saturation of the image data based on at least one of saturation, hue, and luminance of the image data; and maintaining luminance of the image data.

The increasing of the maximum luminance of the image data may include increasing maximum luminance of the image data based on the maximum amount of power.

The increasing of the maximum luminance of the image data may include determining a current gain of driving current of the plurality of display apparatuses, based on the maximum amount of power.

In accordance with still another aspect of the disclosure, there is provided a multi-screen display including: a plurality of display apparatuses; and an image processing apparatus configured to process image data, and transmit the processed image data to the plurality of display apparatuses to collectively display an image of the multi-screen display, wherein the image processing apparatus is configured to apply a tone mapping curve generated such that a total of amounts of power respectively consumed by the plurality of display apparatuses to display respective portions of the image of the multi-screen display thereon is minimized, and to compensate for hue of the image data, and each of the plurality of display apparatuses increases maximum luminance of the image data.

The image processing apparatus may generate a tone mapping curve such that a sum of the total of the amounts of the power consumed by the plurality of display apparatuses to display the image of the multi-screen system and a maximum of amount of power, among the amounts of power respectively consumed by the plurality of display apparatuses to display respective portions of the image of the multi-screen display thereon, is minimized.

The image processing apparatus may compensate for hue of the image data by increasing saturation of the image data.

Each of the plurality of display apparatuses may increase maximum luminance of the image data based on a maximum of the amounts of the power consumed by the plurality of display apparatuses.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
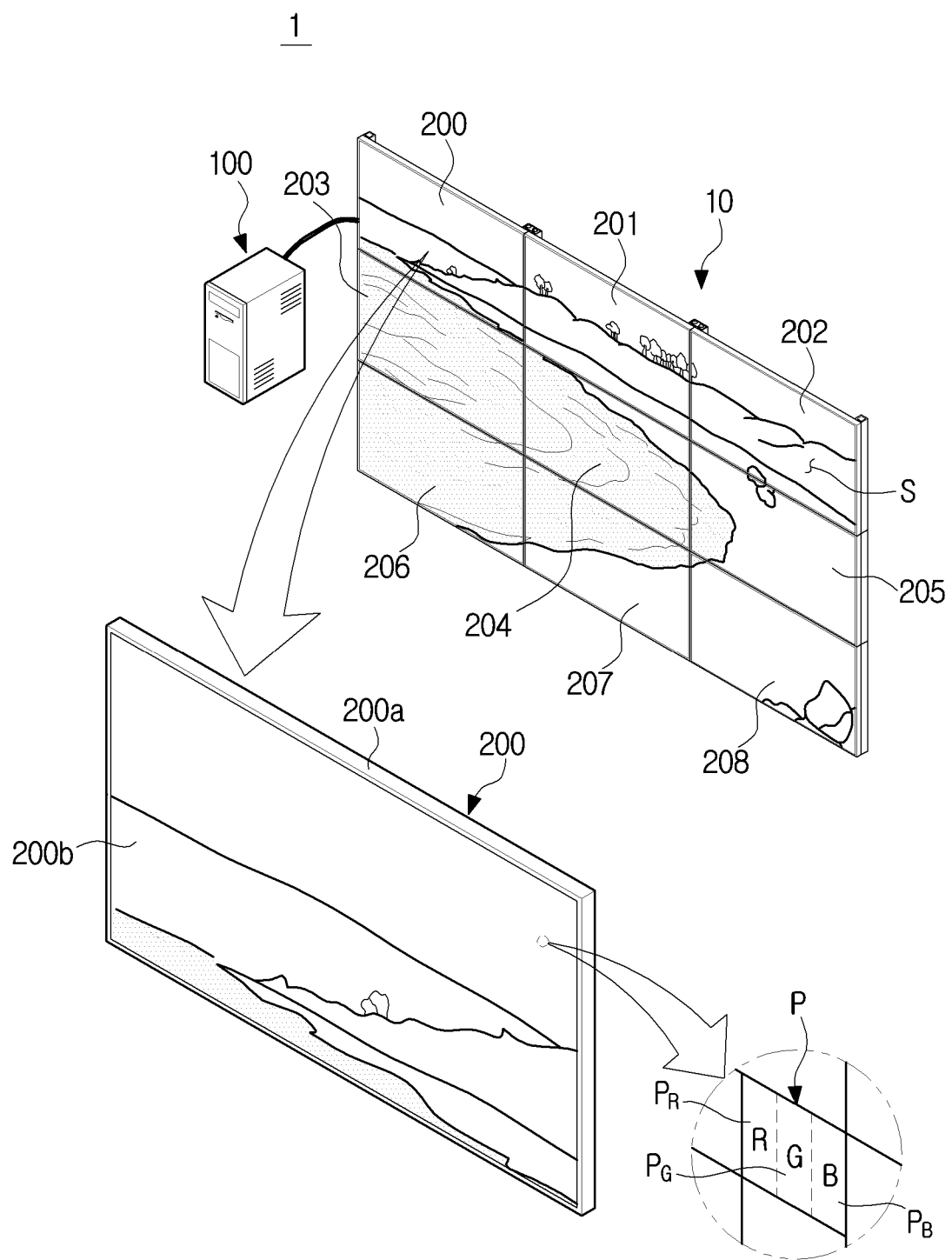
FIG. 1 shows a multi-screen display according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be apparent to those of ordinary skill in the art.

The progression of processing operations described herein is exemplary; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, embodiments will now be described more fully hereinafter with reference to the accompanying drawings. The embodiments may, however, be embodied in many different forms and should not be construed as being limited to the embodiments set forth herein. These embodiments are provided so that this disclosure will be thorough and complete and will fully convey the embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or;" includes any and all combinations of one or more of the associated listed items.

It will be understood that when an element is referred to as being "connected," or "coupled," to another element, the element can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the embodiments of the disclosure, examples of which are illustrated in the accompanying drawings, wherein like reference numerals refer to like elements throughout.

FIG. 1 shows a multi-screen display according to an embodiment.

Referring to FIG. 1, a multi-screen display 1 may include a multi-screen apparatus 10 for visually displaying images, and an image processing apparatus 100 for providing image data to the multi-screen apparatus 10.

The multi-screen apparatus 10 may be a Large Format Display (LFD) that is installed outdoors, such as on the roof of a building or at a bus stop. Herein, outdoors is not necessarily limited to an outdoor environment, and the multi-screen apparatus 10 according to an embodiment may be installed at any transient environment where many people come in and out, such as subway stations, shopping malls, movie theaters, places of business, stores, etc., although the location may be indoors or under cover of precipitation.

The multi-screen apparatus 10 may include a plurality of display apparatuses 200 to 208. The plurality of display apparatuses 200 to 208 may be configured or arranged in the form of a matrix: aligned on the rows or columns of the matrix. The multi-screen apparatus 10 may include a plurality of display apparatuses 200 to 208 arranged on rows and columns, as shown in FIG. 1. In other words, the plurality of display apparatuses 200 to 208 may be arranged in a matrix form. For example, the plurality of display apparatuses 200 to 208 may be arranged in a 3×3 matrix form, a 3×1 matrix form, a 1×3 matrix form, or any other combination. If one or more of the plurality of display apparatuses 200 to 208 are formed to have an irregular shape, the plurality of display apparatuses 200 to 208 may form a multi-screen apparatus 10 having an irregular shape, such as a circle, oval, or any other shape.

Each of the plurality of display apparatuses 200 to 208 may be an apparatus capable of processing image frame data and reproducing corresponding images on respective screens or panels thereof. The plurality of display apparatuses 200 to 208 may be implemented as various types of displays, such as a television (TV), a monitor, a portable multimedia apparatus, a portable communication apparatus, and a portable computing apparatus, so long as the display apparatus has the ability to display images.

The display apparatus 200 among the plurality of display apparatuses 200 to 208 may include a main body 200a or physical structure that accommodates a plurality of components for displaying images, and a screen 200b positioned on one side of the main body 200a to display an image. First to eighth display apparatuses 201 to 208 may be the same as the display apparatus 200.

The main body 200a may form an outer appearance of the display apparatus 200. On the inner side of the main body 200a, the plurality of components for enabling the display apparatus 200 to display the image may be installed. The main body 200a shown in FIG. 1 may be in the shape of a flat plane, however, the shape of the main body 200a is not limited to the shape shown in FIG. 1. According to another example, the main body 200a may be in the shape of a curved plane whose left and right ends protrude forward and whose center portion is recessed.

The screen 200b may be formed in a front surface of the main body 200a, and on the screen 200b, an image may be displayed. For example, on the screen 200b, a still image or a moving image may be displayed, or a 2Dimensional (2D) image or 3Dimensional (3D) image may be displayed. The screen 200b shown in FIG. 1 is in the shape of a flat plane, however, the shape of the screen 200b is not limited to the shape shown in FIG. 1. According to another example, the screen 200b may have a curved shape whose left and right ends protrude forward and whose center portion is recessed, according to the shape of the main body 200a.

In the screen 200b, a plurality of pixels P may be formed, and the image displayed on the screen 200b may be formed by a combination of light emitted from the plurality of pixels P. For example, light emitted from the plurality of pixels P may be combined in mosaic to form an image and moving images on the screen 200b.

Each of the plurality of pixels P may emit light with various brightness and various hue.

To emit light with various brightness, each of the plurality of pixels P may include a component (for example, a light-emitting diode or an organic light-emitting diode) capable of itself emitting light or a component (for example, a backlight unit and a liquid crystal panel) capable of transmitting or blocking light emitted by a backlight unit, etc.

To emit light with various hue, each of the plurality of pixels P may include sub-pixels $P_R$, $P_G$, and $P_B$.

The sub-pixels $P_R$, $P_G$, and $P_B$ may include a red sub-pixel $P_R$ capable of emitting red light, a green sub-pixel $P_G$ capable of emitting green light, and a blue sub-pixel $P_B$ capable of emitting blue light. For example, red light may correspond to light of a wavelength range from about 620 nm (nanometer, one billionth of a meter) to about 750 nm, green light may correspond to light of a wavelength range from about 495 nm to about 570 nm, and blue light may correspond to light of a wavelength range from about 450 nm to about 495 nm.

By combining the red light of the red sub-pixel $P_R$, the green light of the green sub-pixel $P_G$, and the blue light of the blue sub-pixel $P_B$, each of the plurality of pixels P may emit light of various brightness and various hue.

The multi-screen apparatus 10 including the plurality of display apparatuses 200 to 208 may form a screen S as one body. In other words, screens 200b of the plurality of display apparatuses 200 to 208 may be combined to form the screen S of the multi-screen apparatus 10, so that the multi-screen apparatus 10, that is, the plurality of display apparatuses 200 to 208 may display an image as one body. In other words, the respective images displayed on the plurality of display apparatuses 200 to 208 may be displayed in coordination such that the multi-screen apparatus is perceived to display a single cohesive image or moving image.

Each of the plurality of display apparatuses 200 to 208 may display a part of an image displayed on the entire screen S. Each of the plurality of display apparatuses 200 to 208 may occupy an area of the screen S according to its position, and output a part of the image of the multi-screen apparatus 10 according to a position within the configuration of the multi-screen apparatus 10.

The multi-screen apparatus 10 may receive image data through image data transmitting lines from the image processing apparatus 100, and display an image corresponding to the received image frame data.

The image processing apparatus 100 may include a storage medium for storing content including video and audio, and may receive content from an external content source (for example, a video streaming service server). For example, the image processing apparatus 100 may store a file of content data in the storage medium, or receive content data from an external content source.

The image processing apparatus 100 may decode content data stored in the storage medium or received from the external content source to convert the content data to image frame data. For example, the content data may be compressed/encoded by a video compression standard, such as Moving Picture Experts Group (MPEG), High Efficiency Video Coding (HEVC), or the like, and the image processing apparatus 100 may decode the compressed/encoded content data to image frame data representing image frames.

The image processing apparatus 100 may transmit image frame data of the entire image to the plurality of display apparatuses 200 to 208 of the multi-screen apparatus 10. The image processing apparatus 100 may transmit the image frame data in parallel or in series to the plurality of display apparatuses 200 to 208 of the multi-screen apparatus 10. In other words, the image frame data may be transmitted directly from the image processing apparatus 100 to the plurality of display apparatuses 200 to 208 or sequentially from the image processing apparatus 100 to the plurality of display apparatuses 200 to 208.

For example, the image fame data output from the image processing apparatus 100 may be provided to the display apparatus 200, received by the first display apparatus 201 via the display apparatus 200, and then provided to the second display apparatus 202 via the first display apparatus 201. In this way, the image frame data may be provided to the third to eighth display apparatuses 203 to 208, respectively, via the second to seventh display apparatuses 202 to 207 using interconnections between the plurality of display apparatuses 200 to 208. Alternatively, the image processing apparatus 100 may provide the image data to each of the respective display apparatuses 200 to 208 via respective connections between the image processing apparatus 100 and the plurality of display apparatuses 200 to 208.

The display apparatus 200 and the first to eighth display apparatuses 201 to 208 may extract the corresponding parts of the image frame data of the entire image according to their positions, and display images (parts of the entire image) corresponding to the extracted parts of the image fame data. Alternatively, the image data provided to the plurality of display apparatuses 200 to 208 may be only a portion of the entire image of the multi-screen apparatus that is to be displayed by the respective display apparatuses 200 to 208.

For example, the display apparatus 200 and the first to eighth display apparatuses 201 to 208 may store unique identification numbers according to their positions, and extract the corresponding parts of the image frame data of the entire image based on the unique identification numbers.

The display apparatus 200 located in row 1 and column 1 may store a unique identification number "11". The display apparatus 200 located in row 1 and column 1 may divide the entire image to total 9 areas in the form of a 3×3 matrix and extract image frame data of the upper left area from among the 9 areas, according to the unique identification number "11". Then, the display apparatus 200 may display an image corresponding to image frame data of the upper left area.

In this way, each of the display apparatus 200 and the first to eighth display apparatuses 201 to 208 may display a part of an image, and images output from the display apparatus 200 and the first to eighth display apparatuses 201 to 208 may be combined to display a cohesive image.

However, the multi-screen display 1 may cause an increase of power consumption because power is consumed by each of the plurality of display apparatuses 200 to 208. Further, the multi-screen display 1 may cause a user's inconvenience in viewing, such as glare, since the total amount of light emitted from the screen S of the multi-screen increases.

To reduce the power consumption and the user's inconvenience in viewing, the image processing apparatus 100 may process the image frame data to reduce luminance of images output from the plurality of display apparatuses 200 to 208. Also, to control contrast ratio caused by a reduction in luminance of an image, the image processing apparatus 100 may process the image frame data to improve saturation of images output from the plurality of display apparatuses 200 to 208.

Hereinafter, configurations and operations of the image processing apparatus 100 and the display apparatus 200 will be described.

Figure 2:
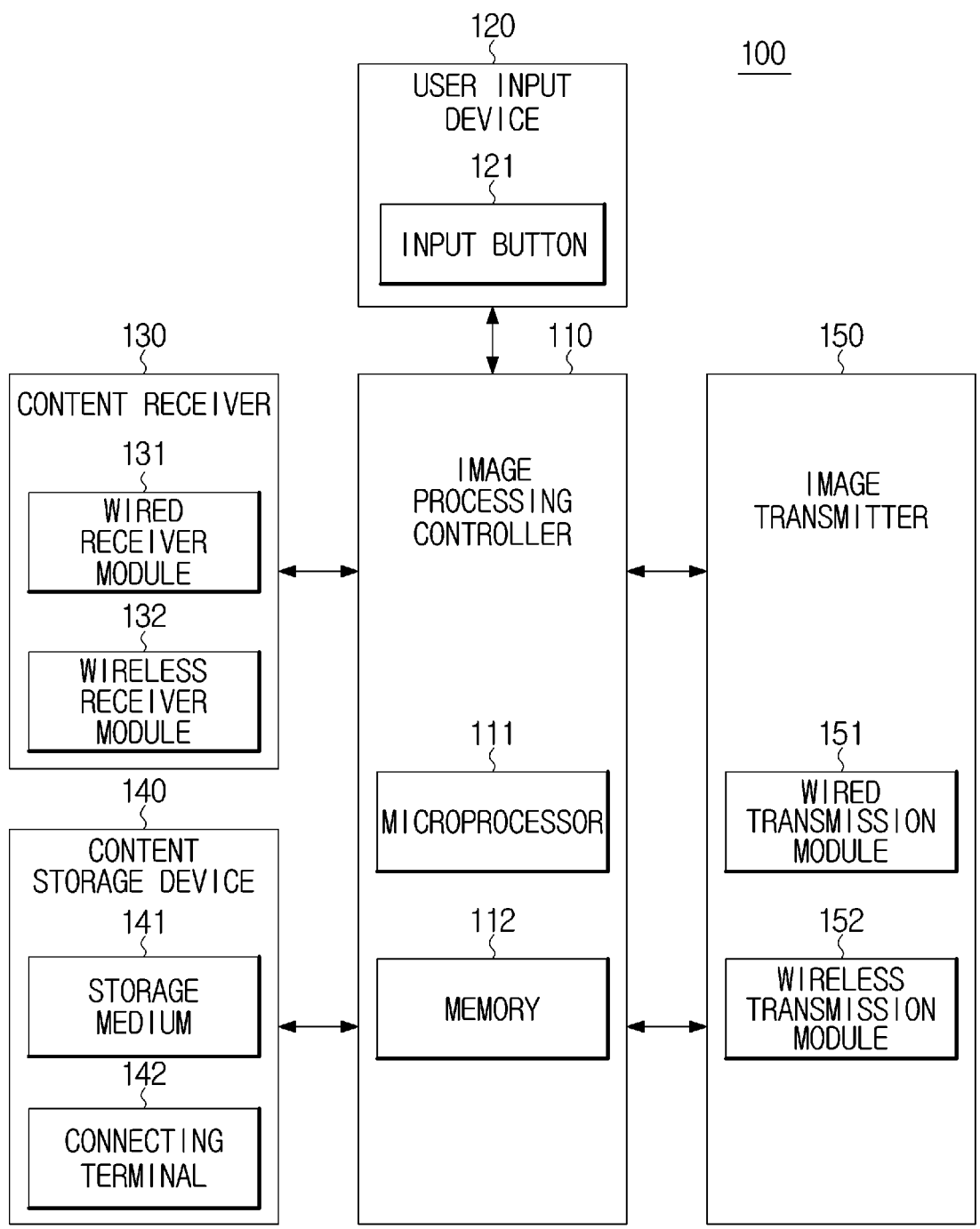
FIG. 2 shows a configuration of an image processing apparatus according to an embodiment.

FIG. 2 shows a configuration of an image processing apparatus according to an embodiment.

Referring to FIG. 2, the image processing apparatus 100 may include a user input device 120 for receiving a user input from a user, a content receiver 130 for receiving content data from a content source, a content storage device 140 for storing content data, an image transmitter 150 for transmitting image frame data to the plurality of display apparatuses 200 to 208, and an image processing controller 110 for processing content data received by the content receiver 130 or stored in the content storage device 140.

The user input device 120 may include an input button 121, such as a hardware button, for receiving a user input. The input button 121 may receive a pre-defined user input from a user. For example, the user input device 120 may include a power button for turning on or off the image processing apparatus 100, a selection button for selecting a content source, a reproducing button for reproducing content or stopping reproducing content, etc.

The input button 121 may output, upon operation by the user, an electrical signal corresponding to a pre-defined command to the image processing controller 110. For example, the input button 121 may be implemented as various kinds of input devices, such as a push switch, a touch switch, a dial, a slide switch, a toggle switch, etc., and when the user activates the input button 121, the input button 121 may output a pre-defined electrical signal to the image processing controller 110. The image processing controller 110 may determine the user's input based on the electrical signal output from the input button 121.

The content receiver 130 may be a communicator that includes a wired receiver module 131 for receiving content data in a wired manner from a content source, and a wireless receiver module 132 for receiving content data in a wireless manner from a content source.

The wired receiver module 131 may receive content data from a content source through various kinds of image transmission cables. For example, the wired receiver module 131 may receive content data from a content source through a component (YPbPr/RGB) cable, a Composite Video Blanking and Sync (CVBS) cable, a High Definition Multimedia Interface (HDMI) cable, an Ethernet (IEEE 802.3 standard) cable, etc.

When the image processing apparatus 100 receives content data from a content source through the wired receiver module 131, the image processing apparatus 100 may receive image frame data from the content source. Herein, the image frame data may be image data not compressed as a bit stream representing an image of a frame. The wired receiver module 131 may have no great limitation on a data transmission rate because the image data is received through an image transmission cable. Therefore, the wired receiver module 131 may receive the image frame data in raw or uncompressed format, in addition to compressed or encoded format, from the content source.

The wireless receiver module 132 may receive content data from a content source using various wireless communication standards.

For example, the wireless receiver module 132 may receive content data from a content source in a wireless manner using a wireless communication standard, such as WiFi (WilFi™, IEEE 802.11 standard), Bluetooth (Bluetooth™, IEEE 802.15.1 standard), or Zigbee (Zigbee™, IEEE 802.15.4 standard). Also, the wireless receiver module 132 may receive content data from a content source in a wireless manner using a wireless communication standard, such as Code Division Multiple Access (CDMA), Wideband Code Division Multiple Access (WCDMA), Global System for Mobile communications (GSM), Long Term Evolution (LTE), Wireless Broadband Internet (Wibro), etc.

When the image processing apparatus 100 receives content data from a content source through the wireless receiver module 132, the image processing apparatus 100 may receive compressed/encoded image data from the content source. Herein, the compressed/encoded image data may represent a bit stream compressed/encoded from an image of one frame or a plurality of frames. The wireless receiver module 132 may have a limitation on a data transmission rate because the image data is received in a wireless manner. Therefore, the wireless receiver module 132 may receive compressed/encoded image data from a content source.

For example, the image frame data may be compressed/encoded by an image compression standard, such as H.264/MPEG-4 AVC (Moving Picture Experts Group-4 Advance Video Coding) or H.265/HEVC (High Efficiency Video Coding). Since the image frame data is compressed/encoded, the compressed/encoded image data may have a smaller capacity (or size) than the corresponding original image frame data.

As such, the content receiver 130 may receive content data in a wired or wireless manner from a content source, and output the received content data to the image processing controller 110.

The content storage device 140 may include a storage medium 141 for storing content data, and a connecting terminal 142 that connects to an external storage medium in which content data is stored.

The storage medium 141 may store content data in the form of a file. For example, the storage medium 141 may store content data in the form of a "*.mpg", "*.avi", "*.asf", or "*.mp4" file.

The storage medium 141 may store content data electrically, magnetically, or optically. For example, the storage medium 141 may be a Solid State Driver (SSD), a Hard Disc Driver (HDD), or an Optical Disc Driver (ODD).

The storage medium 141 may output the content data to the image processing controller 110 in response to a loading command from the image processing controller 110.

The connecting terminal 142 may be connected to an external storage medium storing content data. For example, the connecting terminal 142 may be a Universal Serial Bus (USB) terminal, and be connected to a USB storage medium.

An external storage medium may store content data in the form of a file and store the content data electrically, magnetically, or optically, like the storage medium 141 of the content storage device 140. Also, the external storage medium may output the content data to the image processing controller 110 through the connecting terminal 142 in response to a loading command from the image processing controller 110.

As such, the content storage device 140 may store content data, and output the stored content data to the image processing controller 110.

The image transmitter 150 may be a communicator that includes a wired transmission module 151 for transmitting image frame data output from the image processing controller 110 to the plurality of display apparatuses 200 to 208 in a wired manner, and a wireless transmission module 152 for transmitting image frame data to the plurality of display apparatuses 200 to 208 in a wireless manner.

The wired transmission module 151 may transmit content data to the plurality of display apparatuses 200 to 208 through a component cable, a composite cable, a HDMI cable, an Ethernet cable, etc.

The wireless transmission module 152 may transmit image frame data to the plurality of display apparatuses 200 to 208 through a wireless communication standard, such as WiFi, Bluetooth, Zigbee, etc. For example, the wireless transmission module 152 may emit image frame data through an antenna to transmit the image frame data to the plurality of display apparatuses 200 to 208.

As such, the image transmitter 150 may transmit image frame data output from the image processing controller 110 to the plurality of display apparatuses 200 to 208.

Also, the image transmitter 150 may receive panel information (for example, a power model and a power-maximum luminance model) of the plurality of display apparatuses 200 to 208 from the plurality of display apparatuses 200 to 208.

Although the wireless receiver module 132 and wireless transmission module 152 have been described separately, the wireless receiver module 132 and wireless transmission module 152 may be collectively implemented as a wireless transceiver or communicator for wireless transmitting and receiving data.

The image processing controller 110 may control operations of the content receiver 130 and/or the content storage device 140 and/or the image transmitter 150 according to a user input received through the user input device 120. For example, when the image processing controller 110 receives a command instructing reproduction of content of a content source through the user input device 120, the image processing controller 110 may control the content receiver 130 to receive compressed/encoded image data from the content source, and control the image transmitter 150 to transmit decoded image frame data to the plurality of display apparatuses 200 to 208.

The image processing controller 110 may process image data (image frame data, television broadcasting signals, streaming data, etc.) received through the content receiver 130 or stored in the content storage device 140. For example, the image processing controller 110 may receive compressed/encoded image data from the content receiver 130 and/or the content storage device 140, and decode the compressed/encoded image data to image frame data. Also, the image processing controller 110 may output the decoded image frame data to the image transmitter 150.

The image processing controller 110 may estimate power that is consumed by each of the plurality of display apparatuses 200 to 208, and process the image frame data to reduce luminance of an image output from each of the plurality of display apparatuses 200 to 208 to reduce power consumption of each of the plurality of display apparatuses 200 to 208. Alternatively, the image processing controller 110 may receive power consumed by the plurality of display apparatuses 200 to 208 via the wired transmission module 151 or wireless transmission module 152. Also, the image processing controller 110 may process the image frame data to improve saturation of an image output from each of the plurality of display apparatuses 200 to 208 to reduce a reduction in contrast ratio caused by a reduction in luminance of the image.

The image processing controller 110 may include a microprocessor 111 and memory 112. More specifically, the image processing controller 110 may be implemented with hardware, such as the microprocessor 111 and the memory 112, and software, such as programs, data, etc. stored in the memory 112 and executed by the microprocessor to control operations of the image processing apparatus 100.

The memory 112 may store a program and data for controlling components included in the image processing apparatus 100, and store data generated when controlling the components included in the image processing apparatus 100.

The memory 112 may store a program and data for decoding content data received by the content receiver 130 or stored in the content storage device 140, and store data generated when the image processing apparatus 100 decodes the content data.

The memory 112 may store a program and data for processing image frame data to reduce luminance of an image and improve saturation of the image, and store data generated when the image processing apparatus 100 processes the image frame data.

The memory 112 may include Read Only Memory (ROM) for storing data for a long time, non-volatile memory such as flash memory, and volatile memory, such as Static Random Access Memory (S-RAM) and Dynamic Random Access Memory (D-RAM), for temporarily storing data.

The microprocessor 111 may generate a control signal for controlling an operation of the content receiver 130 and/or the content storage device 140 and/or the image transmitter 150 according to a user input received through the user input device 120 and the program/data stored in the memory 112.

The microprocessor 111 may decode content data of the content receiver 130 and/or content data of the content storage device 140 to image frame data according to the program and data stored in the memory 112.

The microprocessor 111 may process image frame data to reduce luminance of an image and improve saturation of the image according to the program and data stored in the memory 112.

The microprocessor 111 may include an arithmetic circuit or arithmetic logic unit (ALU) for performing logic operations and arithmetic operations, a memory circuit for storing computed data, etc.

A configuration and operation of the image processing controller 110 will be described in more detail below.

As described above, the image processing apparatus 100 may process images that are displayed on the plurality of display apparatuses 200 to 208. More specifically, the image processing apparatus 100 may process image frame data to reduce luminance of an image, and process the image frame data to increase saturation of the image.

As such, by reducing the luminance of an image, power consumption of the plurality of display apparatuses 200 to 208 may be reduced, and by increasing the saturation of the image, a contrast ratio of the image that is displayed on the plurality of display apparatuses 200 to 208 may be improved.

Figure 3:
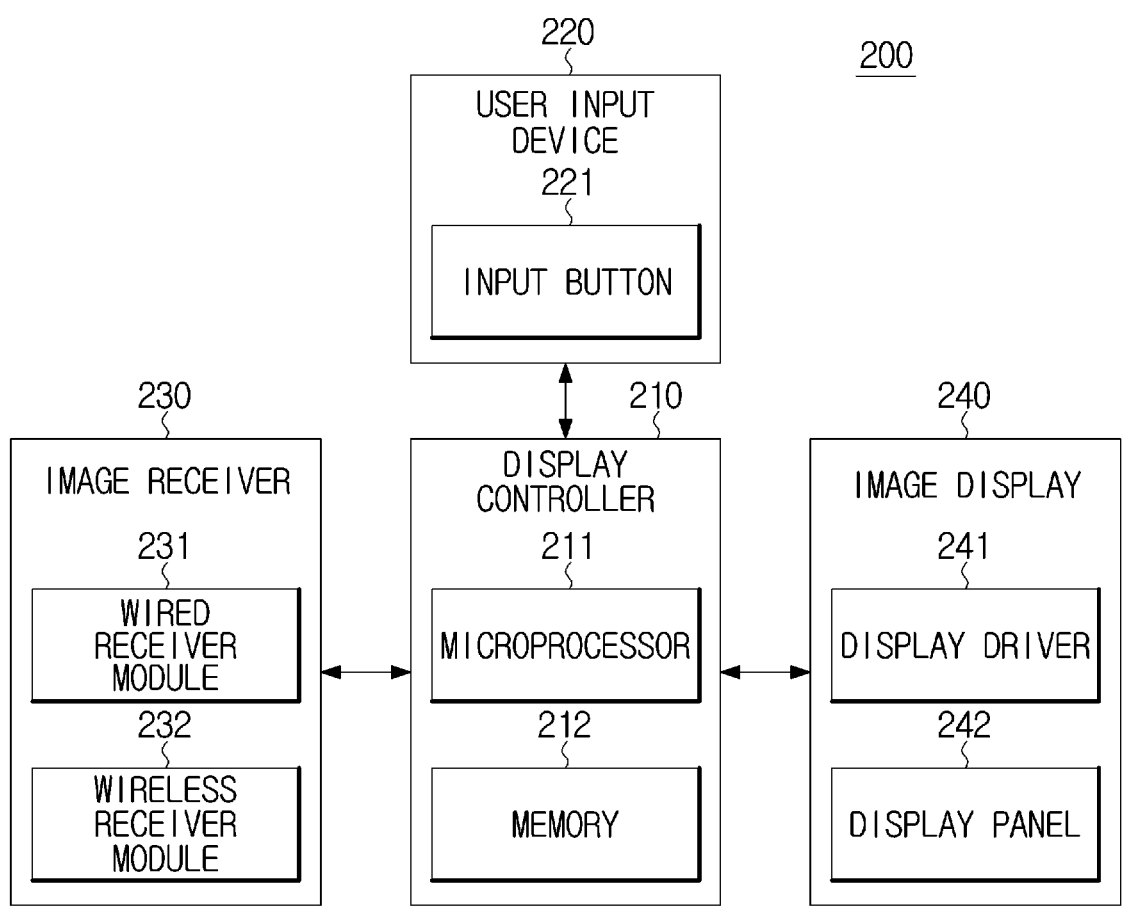
FIG. 3 shows a configuration of a display apparatus according to an embodiment.

FIG. 3 shows a configuration of a display apparatus according to an embodiment.

Hereinafter, a configuration and operation of the display apparatus 200 among the plurality of display apparatuses 200 to 208 will be described. However, configurations and operations of the first to eighth display apparatuses 201 to 208 may be the same as those of the display apparatus 200.

Referring to FIG. 3, the display apparatus 200 may include a user input device 220 for receiving a user input from a user, an image receiver 230 for receiving image frame data from the image processing apparatus 100, an image display 240 for displaying an image, and a display controller 210 for processing image frame data received by the image receiver 230 and outputting the processed image frame data to the image display 240.

The user input device 220 may include an input button 221 for receiving a user input. The input button 221 may receive a pre-defined user input from a user. For example, the user input device 220 may include a power button for turning on or off the display apparatus 200, a selection button for selecting an image source, a setting button for setting luminance, hue, and saturation of an image, etc.

The input button 221 may output, upon operation by a user, an electrical signal corresponding to a pre-defined user input to the display controller 210. For example, the input button 221 may be implemented as various input devices, such as a push switch, a touch switch, a dial, a slide switch, a toggle switch, etc., and when the user activates the input button 221, the input button 221 may output a pre-defined electrical signal to the display controller 210. The display controller 210 may determine a command based on the electrical signal output from the input button 221.

The image receiver 230 may include a wired receiver module 231 for receiving image frame data in a wired manner from the image processing apparatus 100, and a wireless receiver module 232 for receiving image frame data in a wireless manner from the image processing apparatus 100.

The wired receiver module 231 and the wireless receiver module 232 of the image receiver 230 may be respectively similar to the wired receiver module 131 and the wireless receiver module 132 of the image processing apparatus 100.

As such, the image receiver 230 may receive image frame data in a wired or wireless manner from the image processing apparatus 100, and output the received image frame data to the display controller 210.

Also, the image receiver 230 may transmit panel information (for example, a power module and a power-maximum luminance model) of the display apparatus 200 to the image processing apparatus 200.

The image display 240 may include a display panel 242 for displaying images visually, and a display driver 241 for providing an image signal corresponding to image frame data to the display panel 242.

The display panel 242 may create an image according to the image signal received from the display driver 241, and display the image.

The display panel 242 may include a plurality of pixels that are units displaying an image. Each pixel may receive an electrical signal representing an image from the display driver 241, and output an optical signal corresponding to the received electrical signal. Optical signals output from the plurality of pixels may be combined to display an image on the display panel 242.

The display panel 242 may be one of various types of display panels, such as a Liquid Crystal Display (LCD) panel, a Light Emitting Diode (LED) panel, an Organic Light Emitting Diode (OLED) panel, etc.

The LED panel or the OLED panel are self-emissive panels, and when current is supplied to the LED panel or the OLED panel, the LED panel or the OLED panel may emit light. Particularly, as a magnitude of current supplied to the LED panel or the OLED panel increases, an amount of light emitted from the LED panel or the OLED panel may increase accordingly. In other words, the luminance of the LED panel or the OLED panel may increase as a magnitude of current supplied to the LED panel or the OLED panel increases.

Hereinafter, for ease of understanding, the display panel 242 is assumed to be a LED panel or an OLED panel.

The display driver 241 may receive image frame data from the display controller 210, and output driving current corresponding to the image frame data to the display panel 242. More specifically, the display driver 241 may output driving current corresponding to image frame data to the individual pixels constructing the display panel 242.

When the display driver 241 outputs the driving current corresponding to the image frame data to the individual pixels constructing the display panel 242, the individual pixels may output light according to the received driving current, and the light output from the individual pixels may be combined to form an image.

As such, the image display 240 may display an image according to an image frame output from the display controller 210.

The display controller 210 may control operations of the image receiver 230 and/or the image display 240 according to a user input received through the user input device 220. For example, when a brightness reduction command is received through the user input device 220, the display controller 210 may control the display driver 241 to reduce driving current that is supplied to the display panel 242.

The display controller 210 may process image frame data received through the image receiver 230.

The display controller 210 may predict power consumption of the display panel 242 according to the image frame data, and control luminance of the display panel 242 according to the predicted power consumption.

The display controller 210 may include a power model for predicting power consumption of the display panel 242 according to image frame data.

The power model may include power consumption of each pixel according to image frame data. More specifically, the power model may include power consumption information of pixels from power consumption of the pixels by image frame data "0" as 8-bit image frame data to power consumption of the pixels by image frame data "255" as 8-bit image frame data. For example, the power model may include a lookup table including power consumption of pixels corresponding to image frame data, or a relation between image frame data and power consumption of the pixels.

The display controller 210 may predict power consumption of the display panel 242 according to the image frame data using the power model.

Also, the display controller 210 may include a power-maximum luminance model to determine maximum luminance of the display panel 242 according to the power consumption of the display panel 242.

The power-maximum luminance model may define a relationship between power consumption of the display panel 242 and maximum luminance of the display panel 242. For example, when power consumption of the display panel 242 is less than or equal to predetermined reference power, maximum luminance of the display panel 242 may be constant, and when power consumption of the display panel 242 is greater than the predetermined reference power, the power consumption of the display panel 242 may be proportionally inverse to maximum luminance of the display panel 242.

The display controller 210 may adjust luminance of an image using the power-maximum luminance model. When a maximum value of luminance values of the pixels forming an image is less than a maximum luminance value of the display panel 242, the display controller 210 may set a current gain value such that the maximum value of the luminance values of the pixels becomes the maximum luminance value of the display panel 242. Also, the display controller 210 may output the current gain value to the display driver 241, and the display driver 241 may amplify driving current corresponding to image frame data according to the current gain value.

The display controller 210 may include a microprocessor 211 and memory 212. More specifically, the display controller 210 may be implemented with hardware, such as the microprocessor 211 and the memory 212, and software, such as programs, data, etc. stored in the memory 212.

The memory 212 may store programs and data for controlling the components included in the display apparatus 200, and temporarily store data generated when the display controller 210 controls the components included in the display apparatus 200.

The memory 212 may store programs and data for processing image frame data received by the image receiver 230, and store data generated when the display controller 210 processes the image frame data.

The memory 212 may store programs and data for controlling maximum luminance of the display panel 242 according to power consumption of the display panel 242 and adjusting luminance of an image, and store data generated when the display controller 210 controls the maximum luminance of the display panel 242.

The memory 212 may include ROM for persistently storing data, non-volatile memory such as flash memory, and volatile memory, such as S-RAM or D-RAM, for storing data.

The microprocessor 211 may generate a control signal for controlling an operation of the image receiver 230 and/or the image display 240 according to a user input received through the user input device 220 and the programs and data stored in the memory 212.

The microprocessor 211 may process image frame data received by the image receiver 230 according to the programs and data stored in the memory 212.

The microprocessor 211 may control maximum luminance of the display panel 232 and adjust luminance of an image according to power consumption of the display panel 242 based on the programs and data stored in the memory 212.

The microprocessor 211 may include an arithmetic circuit or arithmetic logic unit (ALU) for performing logic operations and arithmetic operations, a memory circuit for storing computed data, etc.

A configuration and operation of the display controller 210 will be described in more detail below.

As described above, the display apparatus 200 may display an image corresponding to image frame data received from the image processing apparatus 100. Particularly, the display apparatus 200 may set maximum luminance of the display panel 242 according to power consumption of the display panel 242, and adjust luminance of the image according to the maximum luminance of the display panel 242.

By adjusting the luminance of the image according to the maximum luminance of the display panel 242, a contrast ratio of the image that is displayed on the display apparatus 200 may be improved.

Hereinafter, a method in which the multi-screen display 1 adjusts luminance of an image to reduce power consumption will be described.

Figure 4:
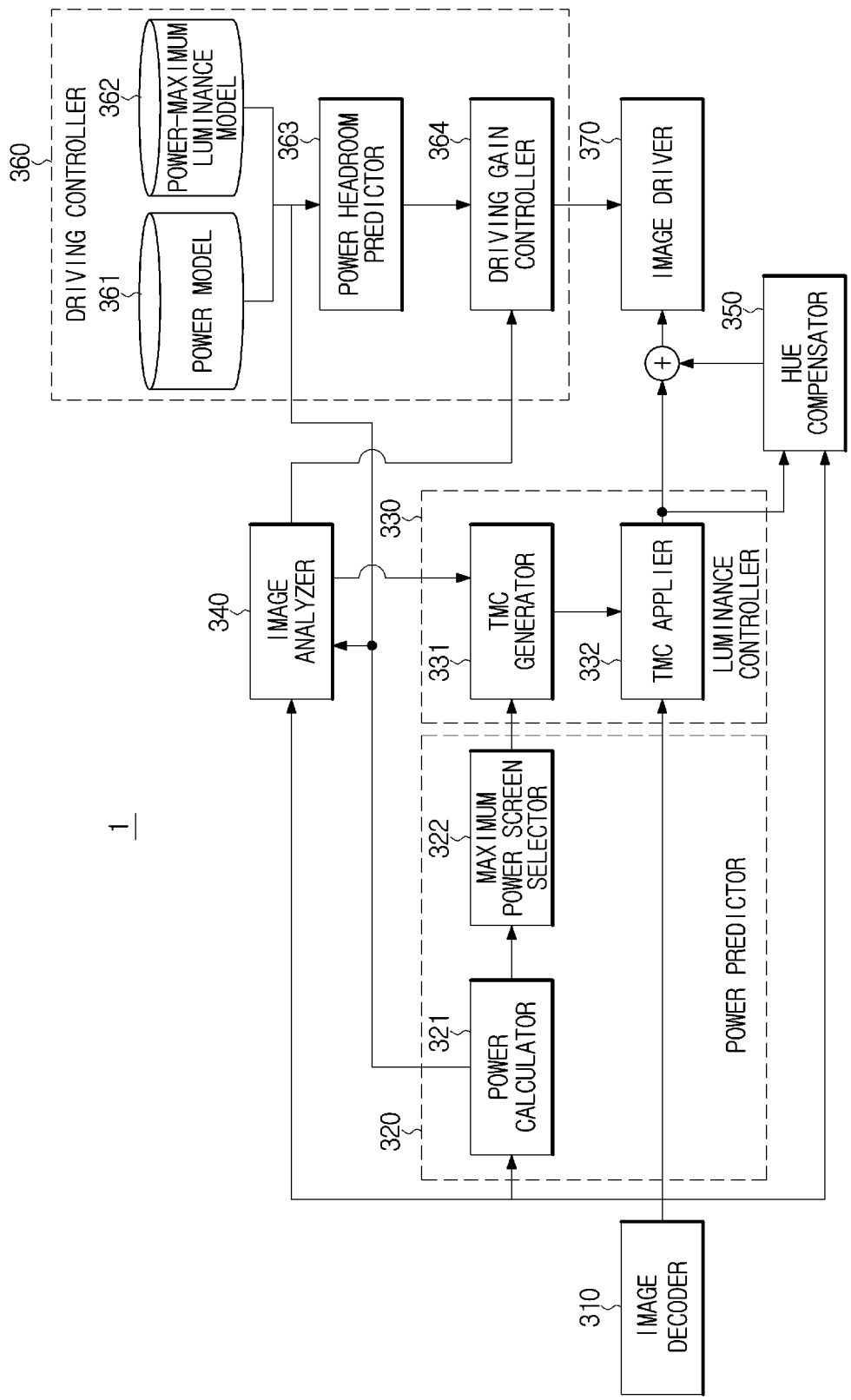
FIG. 4 shows main components of a multi-screen display according to an embodiment.
Figure 5:
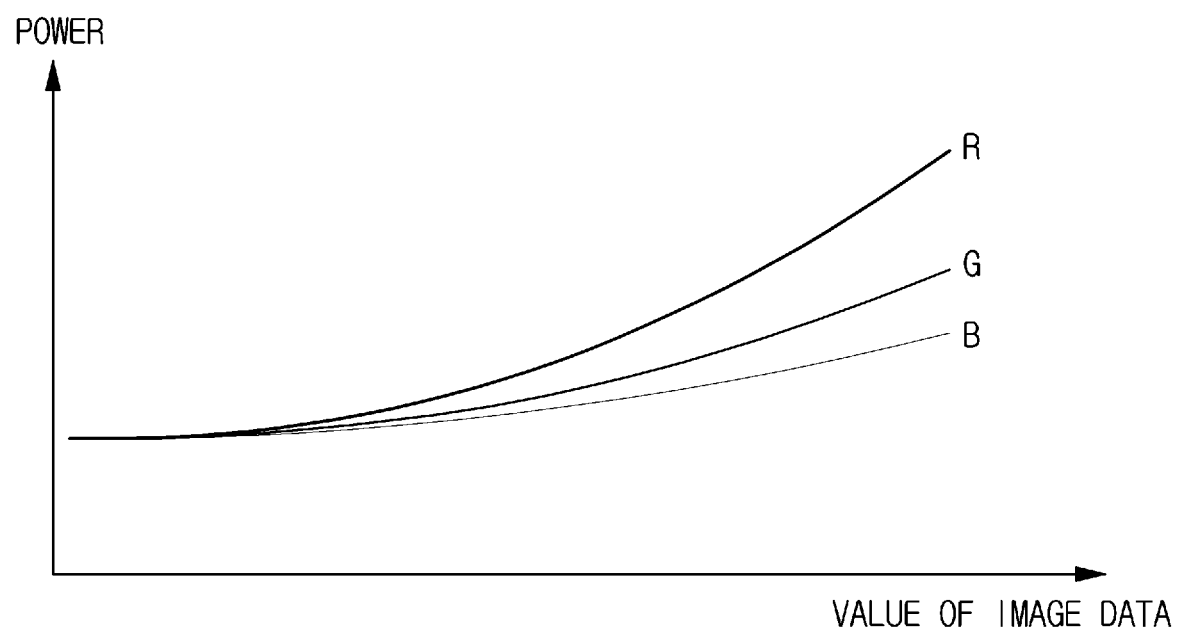
FIG. 5 shows a power model of a display apparatus according to an embodiment.
Figure 6:
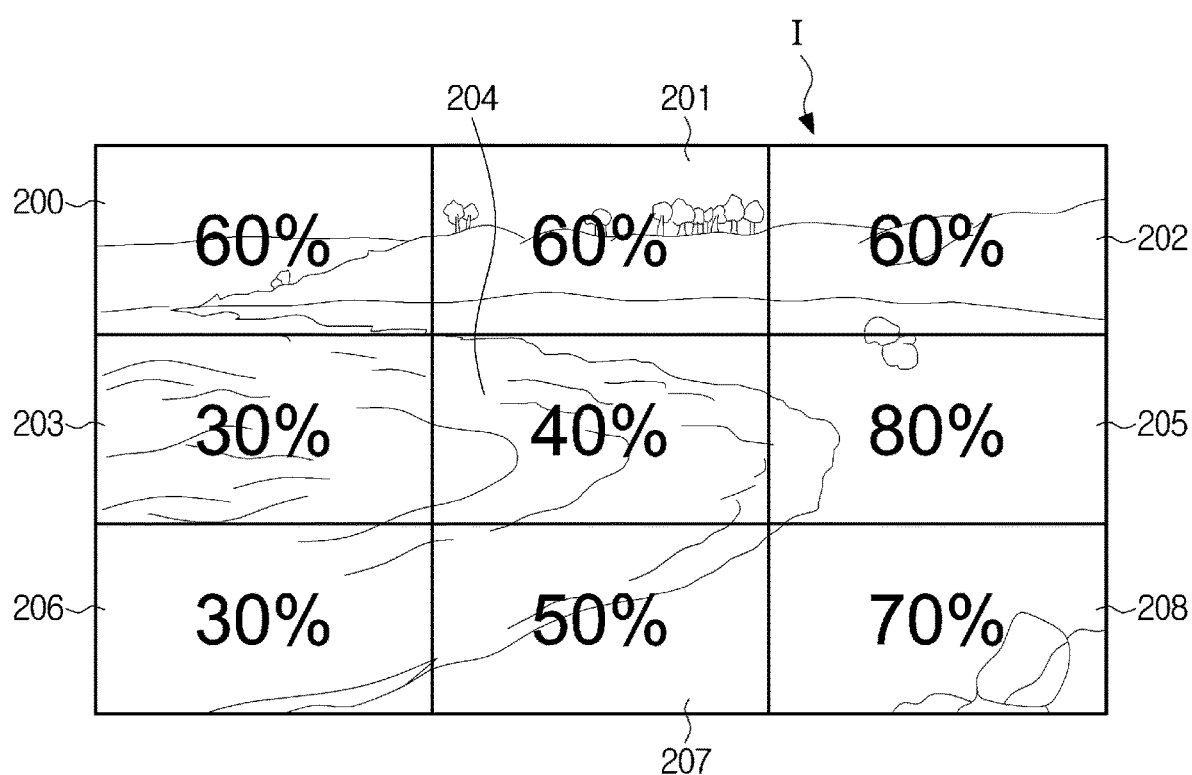
FIG. 6 shows an example in which a multi-screen display according to an embodiment selects a display apparatus consuming maximum power.
Figure 12:
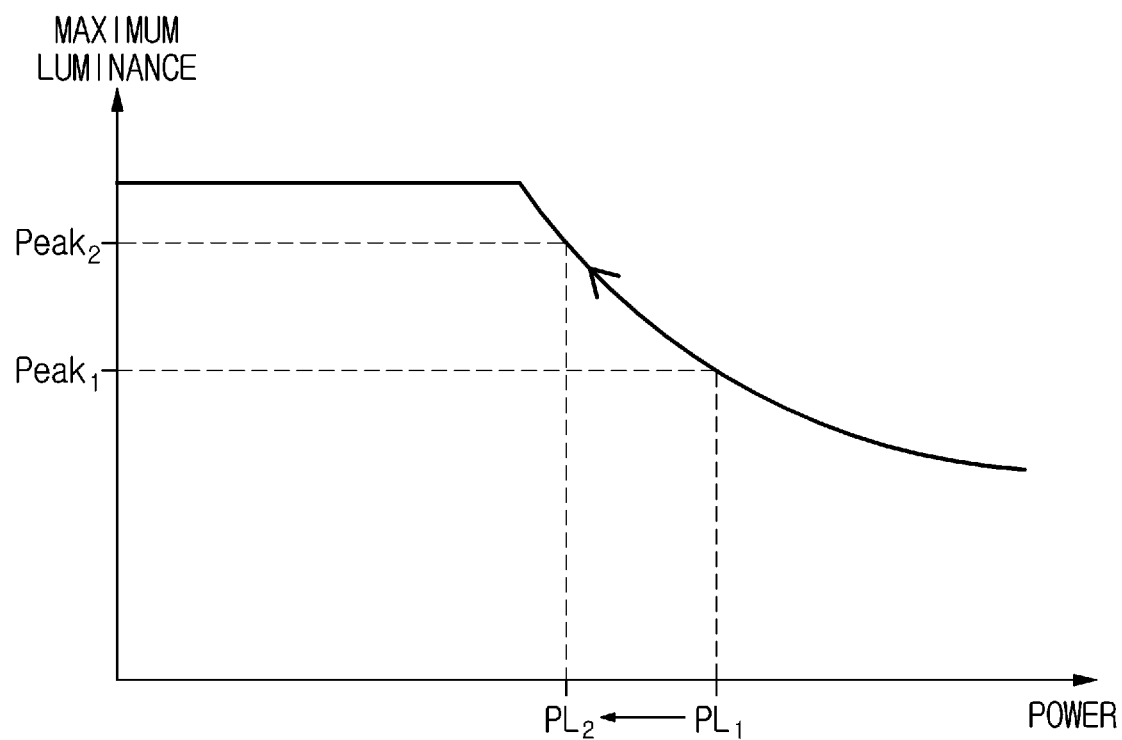
FIG. 12 shows an example in which a multi-screen display according to an embodiment controls maximum luminance of a display panel.
Figure 13:
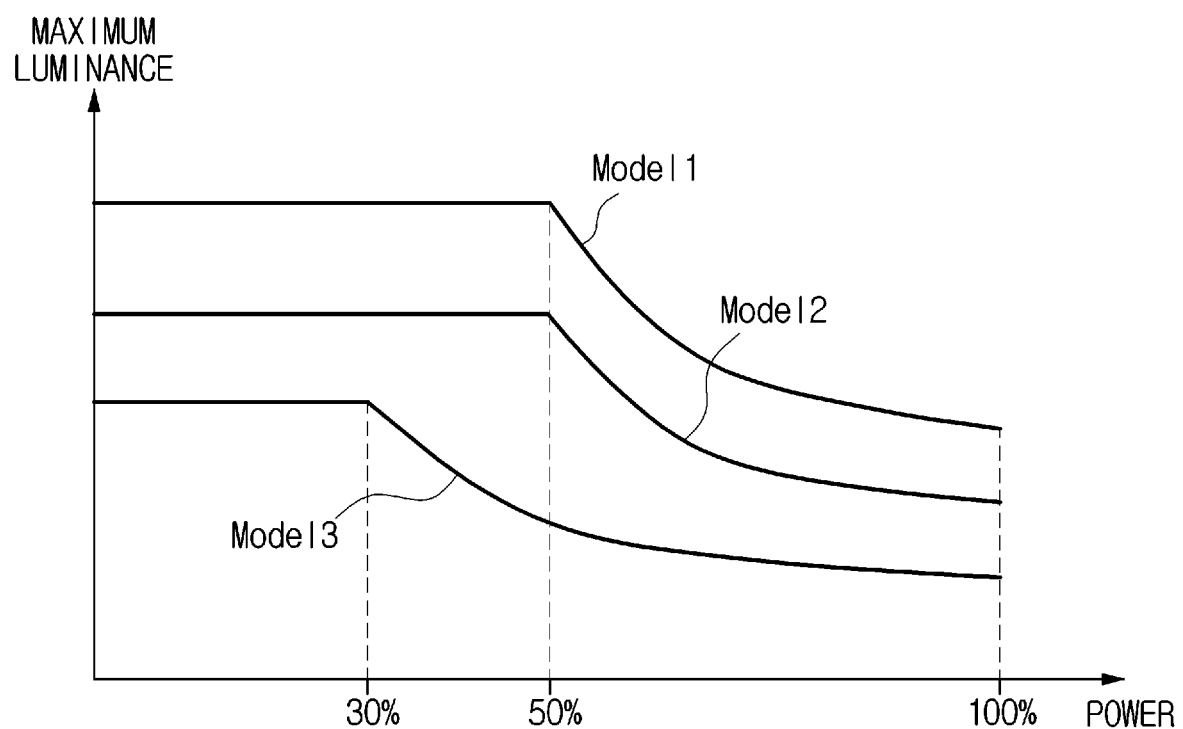
FIG. 13 shows an example in which a multi-screen display according to an embodiment controls maximum luminance of a display panel.

FIG. 4 shows main components of a multi-screen display according to an embodiment. FIG. 5 shows a power model of a multi-screen display according to an embodiment. FIG. 6 shows an example in which a multi-screen display according to an embodiment selects a display apparatus consuming maximum power. FIGS. 7, 8, 9, 10, and 11 show examples in which a multi-screen display according to an embodiment generates tone mapping curves. FIG. 12 shows an example in which a multi-screen display according to an embodiment controls maximum luminance of a display panel. FIG. 13 shows an example in which a multi-screen display according to an embodiment controls maximum luminance of a display panel.

Referring to FIGS. 4, 5, 6, 7, 8, 9, 10, 11, 12, and 13, the multi-screen display 1 may include an image decoder 310, a power predictor 320, a luminance controller 330, an image analyzer 340, a hue compensator 350, a driving controller 360, and an image driver 370.

The components included in the multi-screen display 1 may be implemented by the image processing apparatus 100 a/d/or the display apparatus 200.

For example, the image decoder 310, the power predictor 320, the luminance controller 330, the image analyzer 340, and the hue compensator 350 may be implemented by the image processing controller 110 of the image processing apparatus 100, the driving controller 360 may be implemented by the display controller 210 of the display apparatus 200, and the image driver 370 may be implemented by the display driver 241 of the display apparatus 200.

According to another example, the power predictor 320, the luminance controller 330, the image analyzer 340, the hue compensator 350, and the driving controller 360 may be implemented by the image processing controller 110 of the image processing apparatus 100, and the image driver 370 may be implemented by the display driver 241 of the display apparatus 200.

The image decoder 310 may decode compressed/encoded image data received from a content source to image frame data. For example, the image decoder 310 may decode image data compressed/encoded by an image compression standard, such as H.264/MPEG-4 AVC or H.265/HEVC.

The power predictor 320 may analyze an image displayed by each of the plurality of display apparatuses 200 according to an image frame to calculate power consumption of each of the plurality of display apparatuses 200 to 208, and determine a display apparatus consuming maximum power based on the power consumption of each of the plurality of display apparatuses 200 to 208.

The power predictor 320 may include a power calculator 321 for calculating power consumption of each of the plurality of display apparatuses 200 to 208, and a maximum power screen selector 322 for selecting a display apparatus consuming maximum power.

The power calculator 321 may calculate power consumption of each of the plurality of display apparatuses 200 to 208 based on image frame data using a power model stored in the display apparatus 200 to 208.

More specifically, the power calculator 321 may calculate power consumption that is consumed by each of the plurality of display apparatuses 200 to 208, when an image is displayed by image frame data. To calculate power consumption that is consumed by each of the plurality of display apparatuses 200 to 208, the power calculator 321 may divide the image frame data according to positions of the plurality of display apparatuses 200 to 208. Also, the power calculator 321 may calculate power consumption of each of the plurality of display apparatuses 200 to 208 from a part of image frame data divided from the image frame data.

The power calculator 321 may use a power model 361 of each of the plurality of display apparatuses 200 to 208 to calculate power consumption of each of the plurality of display apparatuses 200 to 208. The power model 361 may include a relation between image frame data and power consumption of pixels. The power model 361 may be implemented as a lookup table or a mathematical equation.

For example, as shown in FIG. 5, as a "value" of image frame data increases, power consumption of the corresponding pixel may increase. More specifically, as a "value" of image frame data increases, power consumption of the corresponding pixel may increase exponentially.

Also, by a "value" of image frame data, power consumption of a red sub-pixel may be higher than consumption of power of a green sub-pixel and a blue sub-pixel, and the power consumption of the green sub-pixel may be higher than consumption of power of the blue sub-pixel.

As such, the power calculator 321 may calculate power consumption of each of the plurality of display apparatuses 200 to 208 using the power models of the plurality of display apparatuses 200 to 208.

First, the power calculator 321 may calculate power consumption of each of pixels included in the plurality of display apparatuses 200 to 208 using Equation (1) below.

$$P_{pixel} = w_r R^r + w_g G^r + w_b B^r, \quad (1)$$

Herein, $P_{pixel}$ represents power consumption of the pixel, $w_r$ represents a weight of the red sub-pixel, $R^r$ represents power consumption of the red sub-pixel, $w_g$ represents a weight of the green sub-pixel, $G^r$ represents power consumption of the green sub-pixel, $w_b$ represents a weight of the blue sub-pixel, and $B^r$ represents power consumption of the blue sub-pixel.

As such, the power calculator 321 may calculate total power consumption of the pixel as a sum of power consumption of the sub-pixels included in the pixel.

Also, the power calculator 321 may calculate power consumption of each of the plurality of display apparatuses 200 to 208 using Equation (2) below.

$$P_{screen} = P_{base} + \sum_{i=1}^{M} P_{pixel}(i). \quad (2)$$

Herein, $P_{screen}$ represents power consumption of each display apparatus, $P_{base}$ represents base power consumption except for power consumption by image frame data, M represents the number of pixels included in the display apparatus, and $P_{pixel}(i)$ represents power consumption of each of the pixels included in the display apparatus.

For example, as shown in FIG. 6, an image I may be displayed by the display apparatuses 200 to 208. In this case, the power calculator 321 may calculate power consumption of the display apparatuses 200 to 208 that display the image I. In FIG. 6, power consumption percentages of the display apparatuses 200 to 208 with respect to a maximum power limit are shown.

As such, the power calculator 321 may calculate power consumption of each of the plurality of display apparatuses 200 to 208 as a sum of base power consumption of the display apparatus and power consumption of the pixels by the image frame data.

The maximum power screen selector 322 may select a display apparatus consuming maximum power by the image frame data from among the plurality of display apparatuses 200 to 208.

Since the power consumption of each of the plurality of display apparatuses 200 to 208 has been calculated by the power calculator 321 described above, the maximum power screen selector 322 may compare the power consumption of the plurality of display apparatuses 200 to 208 to each other to select a display apparatus consuming maximum power.

The maximum power screen selector 322 may select the display apparatus consuming the maximum power, using Equation (3) below.

$$S_{max} = MAX(P_{screen}(i)). \quad (3)$$

Herein, $S_{max}$ represents the display apparatus consuming the maximum power, MAX( ) represents a function of selecting a maximum value from variables, and $P_{pixel}(i)$ represents power consumption of each of pixels included in the display apparatus.

For example, FIG. 6 shows power consumption percentages of the display apparatuses 200 to 208 with respect to the maximum power limit. The maximum power screen selector 322 may determine a fifth display apparatus 205 among the display apparatuses 200 to 208 as a display apparatus consuming maximum power.

The power predictor 320 may output power consumption of the plurality of display apparatuses 200 to 208 and power consumption of the display apparatus consuming the maximum power to the image analyzer 340 and the luminance controller 330.

The luminance controller 330 may generate a tone mapping curve (TMC) (or a tone mapping function) based on the total power consumption of the plurality of display apparatuses 200 to 208 and the power consumption of the display apparatus consuming the maximum power. Also, the luminance controller 330 may apply the tone mapping curve to the image frame data to generate first tone-mapped image frame data.

The tone mapping curve may be a curve for changing luminance of a plurality of pixels composing an image frame. The tone mapping curve may provide various effects, such as an increase or decrease in luminance of an image frame and an increase or decrease in contrast ratio of an image frame. For example, the tone mapping curve may reduce luminance of a plurality of pixels over the entire luminance range or within a predetermined luminance range. Also, a tone mapping curve based on an identity function may output an image frame that is the same as an input image frame.

The luminance controller 330 may include a TMC generator 331 for generating a tone mapping curve, and a TMC applier 332 for applying the tone mapping curve to image frame data.

The TMC generator 331 may generate a tone mapping curve based on a base mapping curve (for example, an identity function), a mapping curve for improving a contrast ratio, total power consumption of the plurality of display apparatuses 200 to 208, and power consumption of the display apparatus consuming the maximum power. Herein, the base mapping curve may be a predetermined tone mapping curve, and may be an identity function of outputting original image frame data as received from the image data source. Also, the mapping curve for improving the contrast ratio may be a tone mapping curve defined in advance to improve a contrast ratio.

More specifically, the TMC generator 331 may quantify similarity between the base mapping curve (for example, an identity function) and the tone mapping curve, and also quantify similarity between the mapping curve for improving the contrast ratio and the tone mapping curve. The TMC generator 331 may predict power consumption of each of the plurality of display apparatuses 200 to 208 changed by the tone mapping curve, and calculate power consumption of the display apparatus consuming the maximum power among the plurality of display apparatuses 200 to 208, changed by the tone mapping curve.

Also, the TMC generator 331 may generate a tone mapping curve such that a sum of the quantified similarity between the base mapping curve (for example, an identity function) and the tone mapping curve, the quantified similarity between the mapping curve for improving a contrast ratio and the tone mapping curve, total power consumption of the plurality of display apparatuses 200 to 208 for displaying an image mapped by the tone mapping curve, and power consumption of the display apparatus consuming the maximum power for displaying an image mapped by the tone mapping curve becomes a minimum value, and output the tone mapping curve.

For example, the TMC generator 331 may generate a tone mapping curve using Equation (4) below.

$$E = \arg\_\min_t \{SIM(t, r_{id.curve}) + \\ \alpha SIM(t, r_{s.curve}) + \beta POW(t, I) + \gamma POW(t, S_{max})\}. \quad (4)$$

Herein, t represents a tone mapping curve [$t_0$, $t_1$, $t_2$, . . . , $t_{255}$], $r_{id.curve}$ represents a base mapping curve (an identity function), and SIM(t, $r_{id.curve}$) represents a function of outputting quantified similarity between t and $r_{id.curve}$. SIM(t, $r_{id.curve}$) may be added to cause the tone mapping curve to maintain similarity to the base mapping curve.

$r_{s.curve}$ represents a tone mapping curve for improving a contrast ratio, and SIM(t, $r_{s.curve}$) represents a function of outputting quantified similarity between t and $r_{s.curve}$. SIM(t, $r_{s.curve}$) may be added to cause the tone mapping curve to improve a contrast ratio of an image.

I represents image frame data, and POW(t, I) represents a function of outputting total power consumption for displaying first image frame data mapped by the tone mapping curve. POW(t, I) may be added to cause power consumption of the plurality of display apparatuses 200 to 208 to be minimized by the tone mapping curve.

$S_{max}$ represents the display apparatus consuming the maximum power among the plurality of display apparatuses 200 to 208, and POW(t, $S_{max}$) represents a function of outputting power consumption of the display apparatus consuming the maximum power among the plurality of display apparatuses 200 to 208. When power consumption of the display apparatus consuming the maximum power is reduced, maximum luminance of the plurality of display apparatuses 200 to 208 may be improved. Accordingly, POW(t, $S_{max}$) may be added to increase luminance of an image that is displayed by the plurality of display apparatuses 200 to 208.

$\arg\_\min_t$(a, b, c, d) represents a function of outputting t(=[$t_0$, $t_1$, $t_2$, ..., $t_{255}$]) at which a sum of a, b, c, and d becomes a minimum value. In other words, $\arg\_\min_t$(a, b, c, d) may generate a tone mapping curve such that a sum of quantified similarity to the base mapping curve, quantified similarity to the mapping curve for improving the contrast ratio, total power consumption of the plurality of display apparatuses 200 to 208, and power consumption of the display apparatus consuming the maximum power among the plurality of display apparatuses 200 to 208 becomes a minimum value. E represents an optimal tone mapping curve, and output the tone mapping curve.

Also, α, β, and γ represent weights. α represents a weight of the quantified similarity between the tone mapping curve and the mapping curve for improving the contrast ratio, β represents a weight of total power consumption for displaying the first image frame data mapped by the tone mapping curve, and γ represents a weight of the power consumption of the display apparatus consuming the maximum power among the plurality of display apparatuses 200 to 208 for displaying the first image frame data.

When all of α, β, and γ decrease, the tone mapping curve may become similar to the base mapping curve. When α increases, the tone mapping curve may become similar to the mapping curve for improving the contrast ratio so that a contrast ratio of an output image may be improved. When β increases, total power consumption of the plurality of display apparatuses 200 to 208 may be reduced. Also, when γ increases, the power consumption of the display apparatus consuming the maximum power among the plurality of display apparatuses 200 to 208 may decrease. When the power consumption of the display apparatus consuming the maximum power decreases, maximum luminance of the plurality of display apparatuses 200 to 208 may be improved.

The weights α, β, and γ may be generated by the image analyzer 340 which will be described below.

The TMC applier 332 may apply a tone mapping curve generated by the TMC generator 331 to image frame data. More specifically, the TMC applier 332 may apply a tone mapping curve to each of pixel data included in image frame data. In other words, the TMC applier 332 may apply the tone mapping curve to each of data (data of red sub-pixels, data of green sub-pixels, and data of blue sub-pixels) of pixels composing an image frame.

The TMC applier 332 may output the first image frame data mapped by the tone mapping curve. In other words, the TMC applier 332 may output data of pixels mapped by the tone mapping curve.

Various tone mapping curves may be generated by α, β, and γ included in Equation (4) described above, and different image frame data may be output from the TMC applier 332 according to the tone mapping curves.

Figure 7:
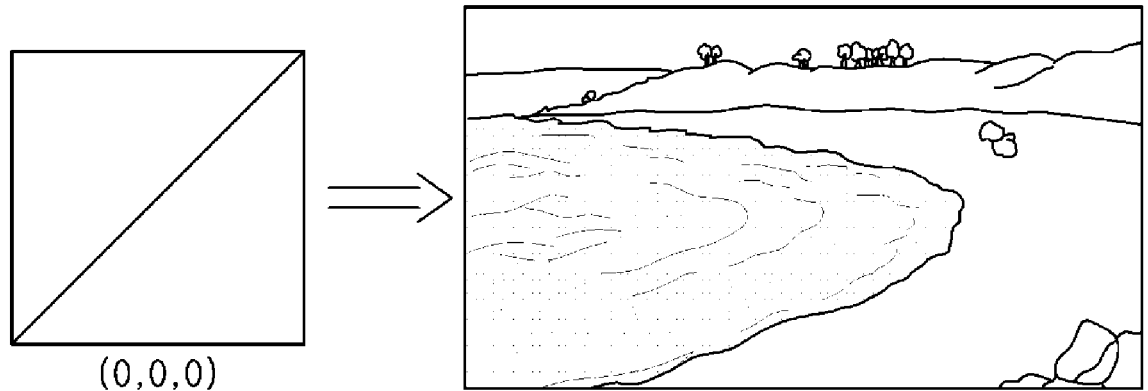
FIGS. 7, 8, 9, 10, and 11 show examples in which a multi-screen display according to an embodiment generates tone mapping curves.

For example, when α, β, and γ are "0", the TMC generator 331 may output a tone mapping curve representing an identity function, as shown in FIG. 7. Also, the TMC applier 332 may output image frame data that is the same as original image frame data.

Figure 8:
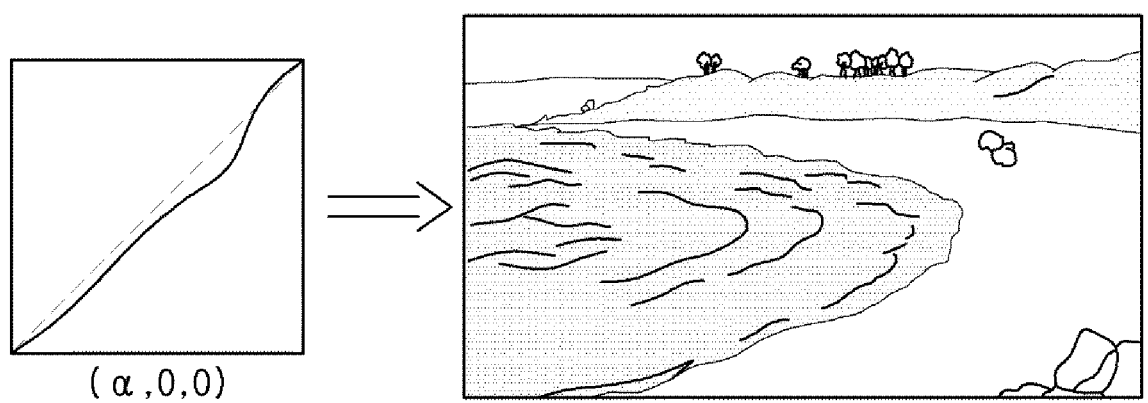

When β and γ are "0", the TMC generator 331 may output a tone mapping curve as shown in FIG. 8. The tone mapping curve may have a great slope in a high luminance area to improve a contrast ratio. As a result, great luminance differences between pixels may appear in the high luminance area by the tone mapping curve. Also, the TMC applier 332 may output image fame data with an improved contrast ratio compared to the original image frame data.

Figure 9:
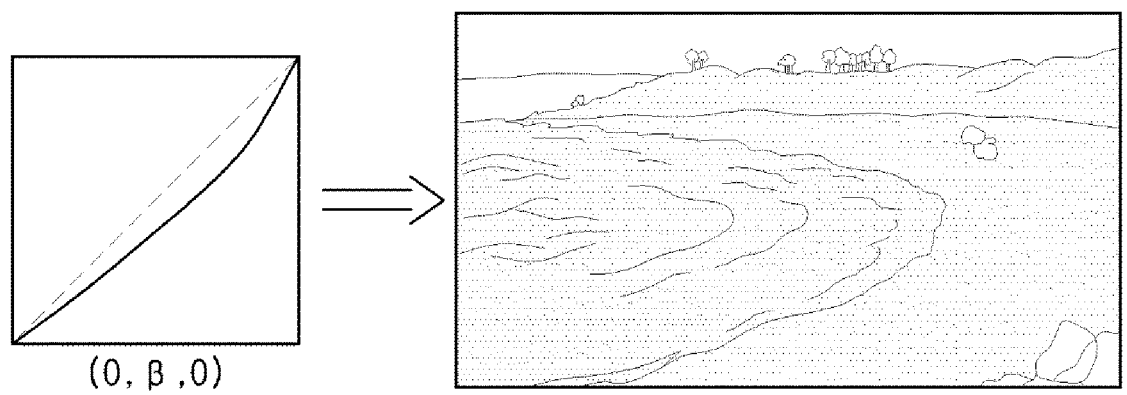

When α and γ are "0", the TMC generator 331 may output a tone mapping curve as shown in FIG. 9. The tone mapping curve may reduce luminance in a luminance area in which many pixels are distributed to reduce power consumption of the plurality of display apparatuses 200 to 208. As a result, the luminance of the entire image frame may be reduced by the tone mapping curve, and power consumption of the plurality of display apparatuses 200 to 208 may be reduced. Also, the TMC applier 332 may output image frame data with low power consumption compared to the original image frame data.

Figure 10:
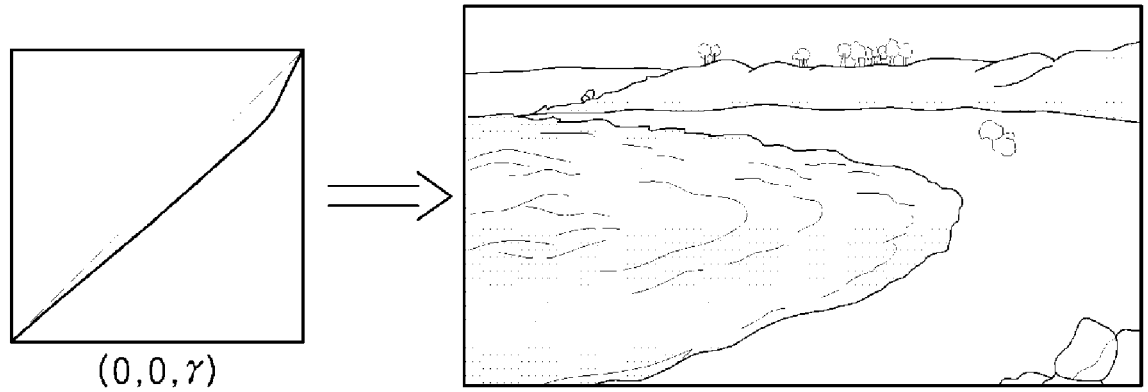

When α and β are "0", the TMC generator 331 may output a tone mapping curve as shown in FIG. 10. The tone mapping curve may reduce luminance of an area displayed by a display apparatus consuming maximum power to reduce power consumption of the display apparatus consuming the maximum power among the plurality of display apparatuses 200 to 208. As a result, the power consumption of the display apparatus consuming the maximum power may be reduced by the tone mapping curve, and since the power consumption of the display apparatus consuming the maximum power is reduced, the luminance of the entire image frame data may increase. Also, the TMC applier 332 may output image frame data with increased luminance compared to the original image frame data.

Figure 11:
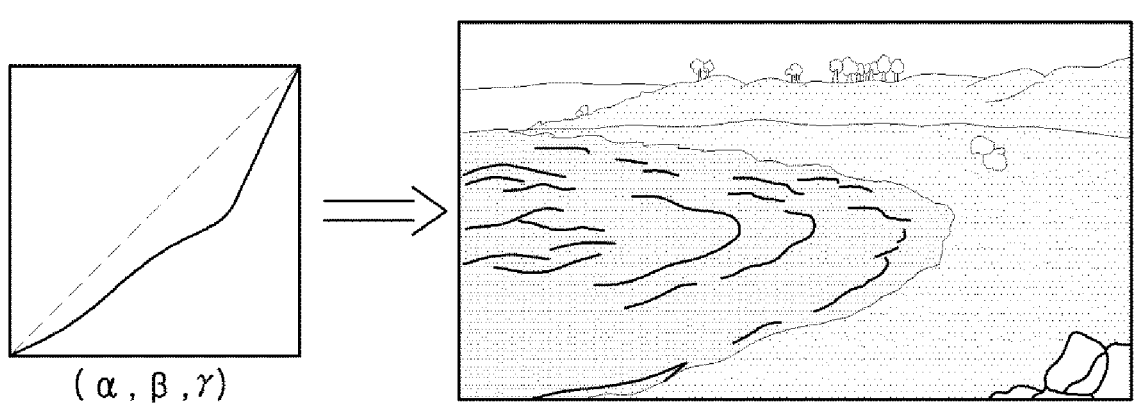

When all of α, β, and γ are not "0", the TMC generator 331 may output a tone mapping curve as shown in FIG. 11. The tone mapping curve may maintain similarity to the base mapping curve and the mapping curve for improving the contrast ratio, reduce total power consumption of the plurality of display apparatuses 200 to 208, and reduce power consumption of the display apparatus consuming the maximum power. As a result, an image frame tone-mapped by the tone mapping curve may maintain similarity to the corresponding original image frame, have an improved contrast ratio compared to the original image frame, reduce total power consumption of the plurality of display apparatuses 200 to 208, and have improved total luminance compared to the original image frame. Also, the TMC applier 332 may output image frame data with an improved contrast ratio and low power consumption compared to the original image frame data.

The image analyzer 340 may analyze an image frame, and output a parameter for generating a tone mapping curve according to the analysis result of the image frame. In other words, the image analyzer 340 may output α, β, and γ of Equation (4) according to the analysis result of the image frame. For example, the image analyzer 340 may generate α, β, and γ according to total power consumption of the plurality of display apparatuses 200 to 208 by the image frame, power consumption of the display apparatus consuming the maximum power by the image frame, and saturation, luminance, and brightness distributions of the image frame.

The weight α may relate to a contrast ratio of the image frame. When the power consumption of the display apparatus consuming the maximum power is high, total power consumption of the plurality of display apparatuses 200 to 208 may be reduced to reduce luminance of the image frame. In this case, the image analyzer 340 may increase α to increase the luminance of the image frame and improve a contrast ratio of the image frame.

For example, the image analyzer 340 may include a lookup table including proper α corresponding to total power consumption of the plurality of display apparatuses 200 to 208 and power consumption of the display apparatus consuming the maximum power. The image analyzer 340 may search the proper α in the lookup table and output the proper α, in response to inputs of total power consumption of the plurality of display apparatuses 200 to 208 and power consumption of the display apparatus consuming the maximum power.

According to another example, the image analyzer 340 may output a using machine learning. More specifically, the image analyzer 340 may be trained to output α. A designer may repeatedly designate proper α according to total power consumption of the plurality of display apparatuses 200 to 208 and power consumption of a display apparatus consuming maximum power. As a result, the image analyzer 340 may perform machine-learning on a relation between maximum values of total power consumption and power consumption and proper α, and may output learned more optimal α in response to inputs of total power consumption of the plurality of display apparatuses 200 to 208 and power consumption of a display apparatus consuming maximum power.

The weight β may relate to total power consumption of the plurality of display apparatuses 200 to 208. The image analyzer 340 may generate proper β in response to image characteristics including saturation, luminance, and brightness distributions of an image frame. In the case of a low-saturation/low-luminance image frame, luminance may be reduced due to a decrease in power consumption, resulting in a significant reduction of a contrast ratio. Accordingly, the image analyzer 340 may generate proper β according to the saturation, luminance, and brightness distributions of the image frame.

For example, the image analyzer 340 may include a lookup table including proper β corresponding to saturation, luminance, and brightness distributions of an image frame. The image analyzer 340 may search proper β in the lookup table, in response to inputs of saturation, illuminance, and brightness distributions of an image frame, and output the proper β.

According to another example, the image analyzer 340 may output β using machine-learning. More specifically, the image analyzer 340 may be trained to output β. A designer may repeatedly designate proper β according to saturation, illuminance, and brightness distributions of an image frame. As a result, the image analyzer 340 may perform machine-learning on a relation between the saturation, luminance, and brightness distributions of the image frame and the proper β, and output learned more optimal β in response to inputs of saturation, luminance, and brightness distributions of an image frame.

Since power consumption of the display apparatus consuming the maximum power relates to maximum luminance of the plurality of display apparatuses 200 to 208, γ may relate to maximum luminance of the plurality of display apparatuses 200 to 208. The image analyzer 340 may generate proper γ based on a brightness distribution of an image frame. For example, when an image frame has a substantially uniform brightness distribution, all of the plurality of display apparatuses 200 to 208 may consume nearly constant power so that γ may be reduced. Accordingly, the image analyzer 340 may generate proper γ according to a brightness distribution of an image frame.

For example, the image analyzer 340 may include a lookup table including proper γ corresponding to a brightness distribution of an image frame. The image analyzer 340 may search proper γ in the lookup table in response to an input of a brightness distribution of an image frame, and output the proper γ.

According to another example, the image analyzer 340 may output γ using machine learning. More specifically, the image analyzer 340 may be trained to output γ. A designer may repeatedly designate proper γ according to a brightness distribution of an image frame. As a result, the image analyzer 340 may perform machine-learning on a relation between a brightness distribution of an image frame and proper γ, and output learned more optimal γ in response to an input of a brightness distribution of an image frame.

As such, the image analyzer 340 may output optimized α, β, and γ according to characteristics of an image frame.

Also, when additional balancing between luminance of an image frame and power consumption is needed, the image analyzer 340 may itself control the driving controller 360. For example, the image analyzer 340 may correct a power-maximum luminance model of the driving controller 360, or limit amplification of driving current by the driving controller 360, which will be described below.

The hue compensator 350 may improve saturation of an image frame to compensate luminance of the image frame reduced by a tone mapping curve of the luminance controller 330.

According to the Helmholtz-Kohlrausch effect, as saturation increases at constant luminance, users may feel as if luminance increases. In other words, when saturation increases without any change of luminance, users may feel as if luminance has increased. Accordingly, the hue compensator 350 may provide an effect as if luminance of an image frame has increased, by increasing saturation of the image frame.

The hue compensator 350 may generate a saturation gain for increasing saturation according to saturation, hue, and luminance of each of pixels configuring an image frame.

For example, the hue compensator 350 may include a lookup table including saturation gains corresponding to saturation, hue, and luminance of pixels. The hue compensator 350 may search a proper saturation gain in the lookup table in response to inputs of saturation, hue, and luminance of a pixel, and output the proper saturation gain.

The hue compensator 350 may calculate a saturation gain using Equation (5), below.

$$\text{Gain}_{saturation} = \text{LUT}(\text{Saturation}_{Level}, \text{Hue}_{Angle}, \text{Luminance}_{Level}). \quad (5)$$

Herein, $\text{Gain}_{saturation}$ represents a saturation gain, LUT( ) represents a lookup table, $\text{Saturation}_{Level}$ represents saturation of a pixel, Hue$_{Angle}$ represents hue of the pixel, and Luminance$_{Level}$ represents luminance of the pixel or a luminance difference from a neighboring pixel.

The hue compensator 350 may calculate a saturation gain using the lookup table of Equation (5), and then interpolate an output of the lookup table to calculate an accurate saturation gain.

According to an example, the hue compensator 350 may include a relation representing a relationship between saturation, hue, and luminance of a pixel and a saturation gain. The hue compensator 350 may output a saturation gain calculated by applying saturation, hue, and luminance of a pixel to the relation.

Also, the hue compensator 350 may generate a saturation gain for increasing saturation according to saturation and hue of each of pixels configuring an image frame. The hue compensator 350 may include a lookup table including saturation gains corresponding to saturation and hue of pixels, or may include a relation representing a relationship between saturation and hue of pixels and saturation gains.

The hue compensator 350 may calculate a saturation gain using Equation (6), below.

$$\text{Gain}_{saturation} = \text{LUT}(\text{Saturation}_{Level}, \text{Hue}_{Angle}). \quad (6)$$

Herein, Gain$_{saturation}$ represents a saturation gain, LUT( ) represents a lookup table, Saturation$_{Level}$ represents saturation of a pixel, and Hue$_{Angle}$ represents hue of the pixel.

Thereafter, the hue compensator 350 may apply the saturation gain to data of a red sub-pixel, data of a green sub-pixel, and data of a blue sub-pixel included in first image frame data tone-mapped by the luminance controller 330. At this time, an increase of saturation may increase luminance, however, may also increase power consumption. Accordingly, the hue compensator 350 may increase saturation of a pixel, while maintaining a sum of the data of the red sub-pixel, the data of the green sub-pixel, and the data of the blue sub-pixel constant. In other words, the hue compensator 350 may apply the saturation gain to the data of the pixel, without any increase or decrease in luminance of the pixel.

For example, the hue compensator 350 may apply a saturation gain to data of a pixel using Equation (7), below.

$$\begin{bmatrix} R_{out} \\ G_{out} \\ B_{out} \end{bmatrix} = \begin{bmatrix} 1+g & -\frac{g}{2} & -\frac{g}{2} \\ -\frac{g}{2} & 1+g & -\frac{g}{2} \\ -\frac{g}{2} & -\frac{g}{2} & 1+g \end{bmatrix} \begin{bmatrix} R_{in} \\ G_{in} \\ B_{in} \end{bmatrix}. \quad (7)$$

Herein, R$_{out}$ represents data of a red sub-pixel to which a saturation gain is applied, G$_{out}$ represents data of a green sub-pixel to which the saturation gain is applied, B$_{out}$ represents data of a blue sub-pixel to which the saturation gain is applied, g represents the saturation gain, R$_{in}$ represents data of the red sub-pixel to which no saturation gain is applied, G$_{in}$ represents data of the green sub-pixel to which no saturation gain is applied, and B$_{in}$ represents data of the blue sub-pixel to which no saturation gain is applied.

As such, the hue compensator 350 may increase saturation of the image frame, without changing the luminance and hue of the image frame. Also, the hue compensator 350 may output second image frame data with the increased saturation to the image driver 370.

The driving controller 360 may output a driving current gain to the image driver 370 to improve luminance of an image frame that is displayed on the display panel 242.

The driving controller 360 may include a power headroom predictor 363 for calculating power headroom remaining after the display panel 242 displays an image frame, and a driving gain controller 364 for calculating a driving current gain for improving luminance of the image frame based on the power headroom. Also, the driving controller 360 may further include a power model 361 and a power-maximum luminance model 362.

The power headroom predictor 363 may calculate power consumption of the display panel 242 to efficiently use power. For example, the power headroom predictor 363 may calculate power consumption of the display panel 241 using the power model 361.

The power model 361 may represent a relationship between image frame data and power consumption of the display panel 242. For example, as a "value" of image frame data increases/decreases, power consumption of the display panel 242 may exponentially increase.

The driving gain controller 364 may calculate a driving gain for increasing luminance of an image frame that is displayed on the display panel 241, based on the power consumption of the display panel 242. By the operations of the power predictor 320, the luminance controller 330, and the image analyzer 340, power consumption of the plurality of display apparatuses 200 to 208 may be reduced. Accordingly, after the display panel 242 displays the image frame, power headroom may be generated, and the power headroom may be used to increase maximum luminance of the display panel 242.

For example, the driving gain controller 364 may determine maximum luminance of the image frame using the power-maximum luminance model 362.

The power-maximum luminance model 362 may represent a relationship between power consumption of the display panel 242 and maximum luminance of the display panel 242. For example, power consumption of the display panel 242 and maximum luminance of the display panel 242 may have a relationship shown in FIG. 12. When power consumption of the display panel 241 is lower than or equal to predetermined reference power (for example, 50% of maximum power), maximum luminance of the display panel 242 may be maintained constant, and when power consumption of the display panel 241 is higher than the predetermined reference power (for example, 50% of maximum power), maximum luminance of the display panel 241 may be reduced according to an increase in power consumption of the display panel 242.

For example, by the operations of the power predictor 320, the luminance controller 330, and the image analyzer 340, power consumption of the display panel 242 may be reduced from first power consumption PL$_1$ to second power consumption PL$_2$. According to the power-maximum luminance model 362, the first power consumption PL$_1$ may correspond to first maximum luminance Peak$_1$, and the second power consumption PL$_2$ may correspond to second maximum luminance Peak$_2$ that is greater than the first maximum luminance Peak$_1$. In other words, the maximum luminance of the display panel 242 may increase to the second maximum luminance Peak$_2$.

In other words, due to a reduction in power consumption of the display panel 242, power headroom may increase, and the increased power headroom may be used to increase luminance of the display panel 242.

As such, a reduction in power consumption of the display panel 242 may increase maximum luminance of an image frame that is displayed by the display panel 242. As a result, the entire luminance of the image frame that is displayed by the display panel 242 may increase.

An increase rate of driving current for increasing maximum luminance of an image frame, that is, a driving current gain may be generated, and the driving current gain may be output to the image driver 370.

Since the multi-screen display 1 includes the plurality of display apparatuses 200 to 208, streaking may be generated in an image frame when different driving current gains are respectively applied to the plurality of display apparatuses 200 to 208. Accordingly, the driving gain controller 364 may calculate a driving current gain based on power consumption of a display apparatus consuming maximum power among the plurality of display apparatuses 200 to 208.

The driving gain controller 364 may receive power consumption of the display apparatus consuming the maximum power among the plurality of display apparatuses 200 to 208 from the power predictor 320, and determine maximum luminance based on the power consumption of the display apparatus consuming the maximum power. Also, the driving gain controller 364 may calculate a driving current gain for increasing driving current based on the maximum luminance.

For example, the driving gain controller 364 may calculate a driving current gain using Equation (8), below.

$$\text{Current\_Gain} = G \times \text{Power\_Peak\_Model}[\max(\text{Power}_{screen})]. \quad (8)$$

Herein, Current_Gain represents a driving current gain, G represents a brightness correction value according to a viewing environment and/or a user setting, Power_Peak_Model[ ] represents a power-maximum luminance model, max( ) represents a maximum value, and $\text{Power}_{Screen}$ represents power consumption of the plurality of display apparatuses 200 to 208.

As seen in Equation (8), the driving gain controller 364 may adjust a driving current gain according to a viewing environment and/or a user setting using the brightness correction value G. For example, when ambient illumination of the display apparatus 200 is low, the driving gain controller 364 may decrease a driving current gain. Also, the driving gain controller 364 may decrease a driving current gain according to a user's panel brightness setting.

Also, the driving gain controller 364 may change the power-maximum luminance model 362 to adjust a driving current gain according to a viewing environment and/or a user setting.

For example, with respect to FIG. 13, when the multi-screen display 1 is installed outdoors, the driving gain controller 364 may use a first power-maximum luminance model Model1 having high maximum luminance for improving a contrast ratio. When the multi-screen display 1 is installed indoors, the driving gain controller 364 may use a second power-maximum luminance model Model2 having lower maximum luminance than the first power-maximum luminance model Model1 to reduce glare and/or eye strain. Also, the driving gain controller 364 may use a third power-maximum luminance model Model3 in which maximum luminance and reference power are reduced.

As described above, the image analyzer 340 may correct, when additional balancing between luminance of an image frame and power consumption is needed, the power-maximum luminance model 362 of the driving gain controller 364.

As such, the driving controller 360 may calculate a driving current gain using the power-maximum luminance model 362, and output the driving current gain to the image driver 370 to increase maximum luminance of the display panel 242.

The image driver 370 may provide driving current to the display panel 242 based on the image frame data and the driving current gain so that an image frame is displayed on the display panel 242.

More specifically, the image driver 370 may receive second image frame data from the hue compensator 350, and receive the driving current gain from the driving controller 360. Then, the image driver 370 may generate driving current based on the second image frame data and the driving current gain, and provide the driving current to the display panel 242.

By the driving current from the image driver 370, an image frame may be displayed on the display panel 242.

As described above, the multi-screen display 1 may generate a tone mapping curve for reducing power consumption of the plurality of display apparatuses 200 to 208, increase saturation of an image frame to improve a contrast ratio of the image frame, and amplify driving current to increase maximum luminance of the image frame. As a result, the multi-screen display 1 may improve the contrast ratio of the image frame, while reducing the power consumption of the plurality of display apparatuses 200 to 208.

Figure 14:
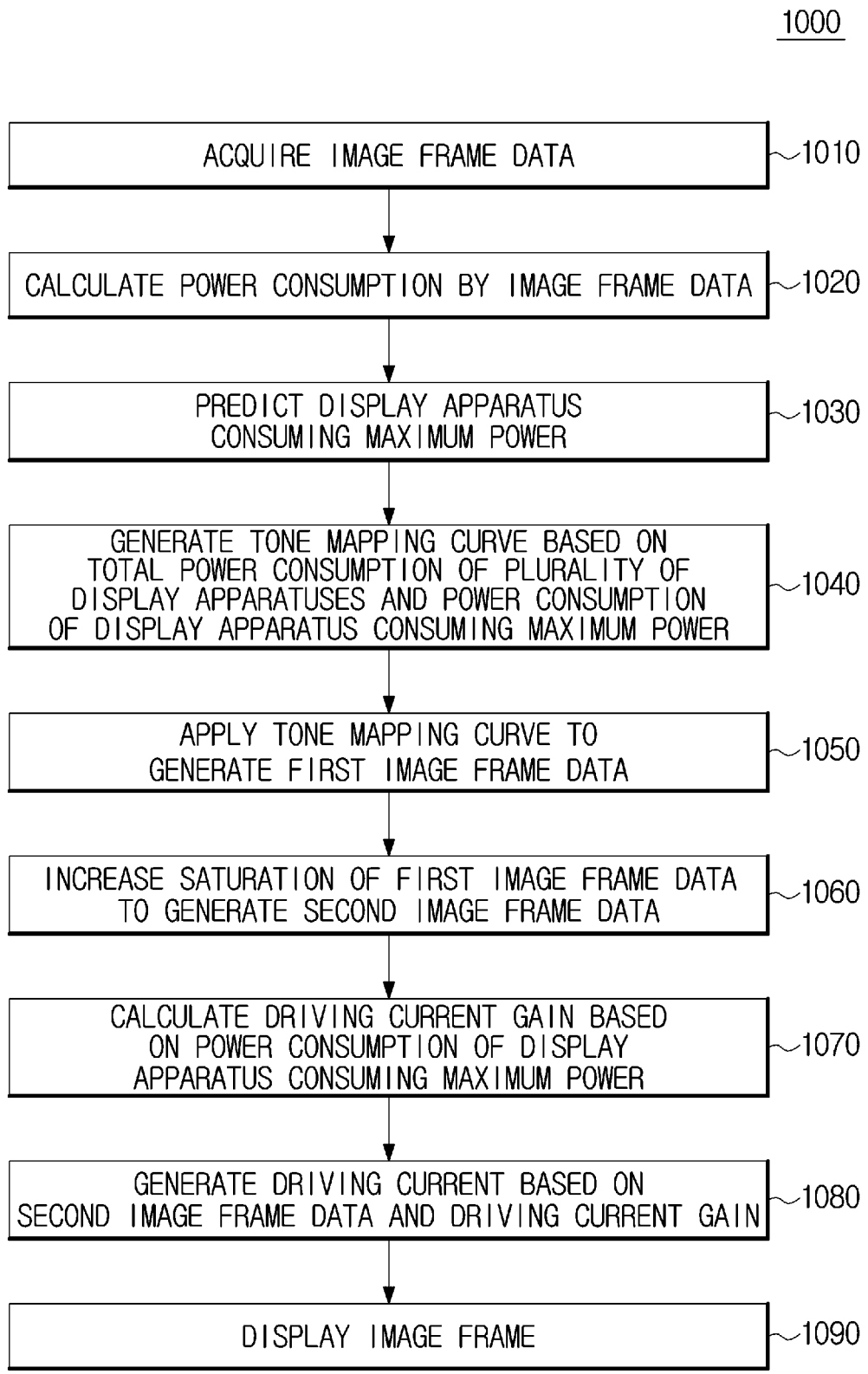
FIG. 14 is a flowchart showing an image processing method of a multi-screen display according to an embodiment.

FIG. 14 is a flowchart showing an image processing method of a multi-screen display according to an embodiment.

Hereinafter, an image processing method 1000 of the multi-screen display 1 will be described with reference to FIG. 14.

The multi-screen display 1 may acquire image frame data, in operation 1010.

The image processing apparatus 100 may receive content data from a content source through the content receiver 130, or load content data stored in the content storage device 140.

The content data may include image frame data, and the image processing apparatus 100 may acquire image frame data from the content data.

Also, the content data may include compressed/encoded image frame data, and the image processing controller 110 may decode the compressed/encoded image frame data to acquire image frame data.

Thereafter, the multi-screen display 1 may calculate total power consumption of the plurality of display apparatuses 200 to 208 per each of the image frame data, in operation 1020.

The image processing controller 110 may divide the image frame data according to positions of the plurality of display apparatuses 200 to 208, and calculate power consumption of each of the plurality of display apparatuses 200 to 208 from a part of image frame data divided from the image frame data.

The image processing controller 110 may calculate power consumption of each of the plurality of display apparatuses 200 to 208 by the part of image frame data using a power model for the corresponding display apparatus. The power model may include a relationship between image frame data and power consumption of each pixel. The power model may be implemented as a lookup table or a mathematical equation.

Then, the multi-screen display 1 may predict a display apparatus consuming maximum power, in operation 1030.

The image processing controller 110 may select a display apparatus consuming maximum power using the image frame data, from among the plurality of display apparatuses 200 to 208.

The image processing controller 110 may compare power consumption of the plurality of display apparatuses 200 to 208 to each other based on the calculated power consumption of the plurality of display apparatuses 200 to 208 calculated in operation 1020 to thus select a display apparatus consuming maximum power.

The multi-screen display 1 may generate a tone mapping curve based on the total power consumption of the plurality of display apparatuses 200 to 208 and the power consumption of the display apparatus consuming the maximum power, in operation 1040.

The tone mapping curve means a curve for changing luminance of a plurality of pixels configuring an image frame. The tone mapping curve may provide various effects, such as an increase or decrease in brightness of an image frame and an increase or decrease in contrast ratio of an image frame.

The image processing controller 110 may calculate first quantified similarity to a base mapping curve (for example, an identity function), second quantified similarity to a mapping curve for improving a contrast ratio, total power consumption of the plurality of display apparatuses 200 to 208, and power consumption of the display apparatus consuming the maximum power. Also, the image processing controller 110 may calculate a first weight of the first similarity, a second weight of the second similarity, a third weight of the total power consumption of the plurality of display apparatuses 200 to 208, and a fourth weight of the power consumption of the display apparatus consuming the maximum power, according to characteristics (for example, saturation, luminance, and brightness distributions) of the image frame.

Thereafter, the image processing controller 110 may generate a tone mapping curve, based on the first similarity to which the first weight is applied, the second similarity to which the second weight is applied, the total power consumption of the plurality of display apparatuses 200 to 208 to which the third weight is applied, and the power consumption of the display apparatus consuming the maximum power to which the fourth weight is applied. More specifically, the image processing controller 110 may generate a tone mapping curve such that a sum of the first similarity to which the first weight is applied, the second similarity to which the second weight is applied, the total power consumption of the plurality of display apparatuses 200 to 208 to which the third weight is applied, and the power consumption of the display apparatus consuming the maximum power to which the fourth weight is applied becomes a minimum value.

The multi-screen display 1 may apply the tone mapping curve to the image frame data to generate first image frame data, in operation 1050.

The image processing controller 110 may apply the tone mapping curve generated in operation 1040 to the image frame data acquired in operation 1010. More specifically, the image processing controller 110 may apply the tone mapping curve to each of pixel data included in the image frame data to generate first tone-mapped image frame data.

The multi-screen display 1 may increase saturation of the first tone-mapped image frame data to generate second image frame data, in operation 1060.

According to the Helmholtz-Kohlrausch effect, as saturation increases at constant luminance, users may feel as if luminance increases.

To increase cognitive luminance, the image processing controller 110 may generate a saturation gain for increasing saturation according to saturation, hue, and/or luminance of each of pixels configuring the image frame. Also, the image processing controller 110 may apply the saturation gain to data of a red sub-pixel, data of a green sub-pixel, and data of a blue sub-pixel, included in the first tone-mapped image frame data, to generate second image frame data.

The image processing apparatus 100 may transmit the second image frame data to the plurality of display apparatuses 200 to 208.

The multi-screen display 1 may calculate a driving current gain based on the power consumption of the display apparatus consuming the maximum power among the plurality of display apparatuses 200 to 208, in operation 1070.

The display apparatus 200 may receive the second image frame data from the image processing apparatus 100. Also, the display apparatus 200 may receive power consumption of the display apparatus consuming the maximum power from the image processing apparatus 100.

The display controller 210 of the display apparatus 200 may determine maximum luminance of the image frame using the power-maximum luminance model 362 based on the power consumption of the display apparatus consuming the maximum power. More specifically, the display apparatus 200 may apply the power consumption of the display apparatus consuming the maximum power to the power-maximum luminance model 362 to determine maximum luminance of the image frame. The power-maximum luminance model 362 may represent a relationship between power consumption of the display panel 242 and maximum luminance of the display panel 242.

Due to a decrease of power consumption of the plurality of display apparatuses 200 to 208, the power consumption of the display apparatus consuming the maximum power may decrease accordingly, and maximum luminance of the image frame may increase. The display controller 210 may calculate a driving current gain corresponding to the increase of the maximum luminance of the image frame.

The multi-screen display 1 may generate driving current for driving the display panel 242 based on the second image frame data and the driving current gain, in operation 1080.

The display driver 241 of the display panel 200 may generate driving current corresponding to the second image frame data, and amplify the driving current based on the driving current gain. Also, the display driver 241 may output the driving current to the display panel 242.

The multi-screen display 1 may display the image frame, in operation 1090.

Each of the pixels included in the display panel 242 may emit light according to the driving current received from the display driver 241. Light emitted by the individual pixels may be combined to display a cohesive image frame.

As described above, the multi-screen display 1 may generate a tone mapping curve for reducing power consumption of the plurality of display apparatuses 200 to 208, increase saturation of an image frame to improve a contrast ratio of the image frame, and amplify driving current to increase maximum luminance of the image frame. As a result, the multi-screen display 1 may improve the contrast ratio of the image frame, while reducing the power consumption of the plurality of display apparatuses 200 to 208.

According to an aspect of the disclosure, there may be provided an image processing apparatus, an image processing method, and a multi-screen display for transmitting image data to a plurality of display apparatuses capable of displaying an image in cooperation with each other.

According to another aspect of the disclosure, there may be provided an image processing apparatus, an image processing method, and a multi-screen display for reducing power consumption of a multi-screen apparatus.

According to still another aspect of the disclosure, there may be provided an image processing apparatus, an image processing method, and a multi-screen display for improving a contrast ratio of a multi-screen apparatus.

Although a few embodiments of the disclosure have been shown and described, it would be appreciated by those skilled in the art that changes may be made in these embodiments without departing from the principles and spirit of the disclosure, the scope of which is defined in the claims and their equivalents.

Embodiments of the disclosure have been described above. In the embodiments described above, some components may be implemented as a "module" (or "unit"). Here, the term 'module' (or 'unit') means, but is not limited to, a software and/or hardware component, such as a Field Programmable Gate Array (FPGA) or Application Specific Integrated Circuit (ASIC), which performs certain tasks. A module (or unit) may advantageously be configured to reside on the addressable storage medium and configured to execute on one or more processors.

Thus, a module (or unit) may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

In addition to the above described embodiments, embodiments can thus be implemented through computer readable code/instructions stored in/on a medium, e.g., a computer readable medium, to control at least one processing element to implement any above described embodiment. The medium can correspond to any medium/media permitting the storing and/or reading of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An image processing apparatus comprising:
   a communicator configured to communicate with a plurality of display apparatuses that collectively display an image of a multi-screen system; and
   a controller configured to:
      process image data to be displayed as the image of the multi-screen system on the plurality of display apparatuses,
      wherein the controller is configured process the image data by:
         applying a tone mapping curve that is generated based on a maximum of amount of power, among amounts of power respectively consumed by the plurality of display apparatuses to display respective portions of the image of the multi-screen system thereon,
         compensating for hue of the image data, and
         increasing maximum luminance of the image data, and
      control the communicator to transmit processed image data to the plurality of display apparatuses to display the image of the multi-screen system.

2. The image processing apparatus according to claim 1, wherein the controller is configured to generate the tone mapping curve such that a total of the amounts of the power consumed by the plurality of display apparatuses to display the image of the multi-screen system is minimized.

3. The image processing apparatus according to claim 1, wherein the controller is configured to generate the tone mapping curve such that a sum of the total of the amounts of the power consumed by the plurality of display apparatuses to display the image of the multi-screen system and the maximum amount of power consumed is minimized.

4. The image processing apparatus according to claim 1, wherein the controller is configured to generate the tone mapping curve such that a sum of the total of the amounts of the power consumed by the plurality of display apparatuses, to which a first weight is applied, and the maximum amount power, to which a second weight different from the first weight is applied, becomes a minimum value, and
   the first weight and the second weight are determined based on at least one of saturation and luminance of the image data.

5. The image processing apparatus according to claim 1, wherein the controller is configured to generate the tone mapping curve such that a sum of a quantified similarity between the tone mapping curve and an identity curve, a quantified similarity between the tone mapping curve and a contrast ratio enhancing curve, a total of the amounts of the power consumed by the plurality of display apparatuses, and the amounts of the power consumed by the plurality of display apparatuses is minimized.

6. The image processing apparatus according to claim 1, wherein the controller is further configured to compensate for hue of the image data by increasing saturation of the image data.

7. The image processing apparatus according to claim 1, wherein the controller is further configured to increase the maximum luminance of the image data based on the maximum amount of power.

8. The image processing apparatus according to claim 1, wherein the controller is further configured to determine a current gain of driving current of the plurality of display apparatuses based on the maximum amount of power.

9. An image processing method for processing image data to be displayed by a plurality of display apparatuses that collectively display an image of a multi-screen system, the method comprising:

generating a tone mapping curve based on a maximum of amount of power, among amounts of power respectively consumed by the plurality of display apparatuses to display respective portions of the image of the multi-screen system thereon;

applying the tone mapping curve to the image data;

compensating for hue of the image data;

increasing maximum luminance of the image data; and transmitting processed image data to the plurality of display apparatuses to display the image of the multi-screen system.

10. The image processing method according to claim 9, wherein the generating comprises generating the tone mapping curve such that a sum of the total of the amounts of the power consumed by display apparatuses to display the image of the multi-screen system and the maximum amount of power is minimized.

11. The image processing method according to claim 9, wherein the generating of comprises generating the tone mapping curve such that a sum of the total of the amounts of the power consumed by display apparatuses, to which a first weight is applied, and the maximum amount of power, to which a second weight different from the first weight is applied, is minimized, and the first weight and the second weight are determined based on at least one of saturation and luminance of the image data.

12. The image processing method according to claim 9, wherein the generating comprises generating the tone mapping curve such that a sum of a quantified similarity between the tone mapping curve and an identity curve, a quantified similarity between the tone mapping curve and a contrast ratio enhancing curve, a total of the amounts of the power consumed by the plurality of display apparatuses, and the amounts of the power consumed by the plurality of display apparatuses is minimized.

13. The image processing method according to claim 9, wherein the compensating for the hue of the image data comprises increasing saturation of the image data.

14. The image processing method according to claim 9, wherein the compensating for the hue of the image data comprises:

increasing saturation of the image data based on at least one of saturation, hue, and luminance of the image data; and maintaining luminance of the image data.

15. The image processing method according to claim 9, wherein the increasing of the maximum luminance of the image data comprises increasing maximum luminance of the image data based on the maximum amount of power.

16. The image processing method according to claim 9, wherein the increasing of the maximum luminance of the image data comprises determining a current gain of driving current of the plurality of display apparatuses, based on the maximum amount of power.

17. A multi-screen display comprising:

a plurality of display apparatuses; and an image processing apparatus configured to process image data, and transmit the processed image data to the plurality of display apparatuses to collectively display an image of the multi-screen display, wherein the image processing apparatus is configured to apply a tone mapping curve generated such that a total of amounts of power respectively consumed by the plurality of display apparatuses to display respective portions of the image of the multi-screen display thereon is minimized, and to compensate for hue of the image data, and wherein each of the plurality of display apparatuses increases maximum luminance of the image data.

18. The multi-screen display according to claim 17, wherein the image processing apparatus is configured to generate the tone mapping curve such that a sum of the total of the amounts of the power consumed by the plurality of display apparatuses to display the image of the multi-screen system and a maximum of amount of power, among the amounts of power respectively consumed by the plurality of display apparatuses to display respective portions of the image of the multi-screen display thereon, is minimized.

19. The multi-screen display according to claim 17, wherein the image processing apparatus is configured to compensate for hue of the image data by increasing saturation of the image data.

20. The multi-screen display according to claim 17, wherein each of the plurality of display apparatuses is configured to increase maximum luminance of the image data based on a maximum of the amounts of the power consumed by the plurality of display apparatuses.

* * * * *